US012480753B2

(12) United States Patent
Ulken et al.

(10) Patent No.: US 12,480,753 B2
(45) Date of Patent: Nov. 25, 2025

(54) METHOD AND ASSEMBLY FOR CONTAINING A HAZARDOUS OBJECT

(71) Applicant: Accenture Global Solutions Limited, Dublin (IE)

(72) Inventors: Ulf-Dieter Ulken, Seevetal (DE); Mithul Nair, Harsefeld (DE); Jack Ibrahim, Kiel (DE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 253 days.

(21) Appl. No.: 18/204,452

(22) Filed: Jun. 1, 2023

(65) Prior Publication Data

US 2024/0044632 A1 Feb. 8, 2024

Related U.S. Application Data

(60) Provisional application No. 63/395,921, filed on Aug. 8, 2022.

(51) Int. Cl.

*F42D 5/045* (2006.01)
*A62C 3/16* (2006.01)

(Continued)

(52) U.S. Cl.

CPC ................ *F42D 5/045* (2013.01); *A62C 3/16* (2013.01); *B65D 85/68* (2013.01); *F42B 39/20* (2013.01); *B65D 2585/88* (2013.01)

(58) Field of Classification Search

CPC ............. F42B 39/20; F42D 5/04; F42D 5/045

(Continued)

(56) References Cited

U.S. PATENT DOCUMENTS 3,814,016 A * 6/1974 Leach ........................ F42D 5/05 102/303
5,668,342 A * 9/1997 Discher ..................... F42D 5/04 102/293

(Continued)

OTHER PUBLICATIONS

AvSax.com [online], "AvSax," available on or before May 13, 2021 via Internet Archive: Wayback Machine URL<http://web.archive.org/web/20210513222427/https://avsax.com/>, retrieved on Nov. 2, 2023, retrieved from URL<https://avsax.com/>, 5 pages.

(Continued)

*Primary Examiner* — Jonathan C Weber
(74) *Attorney, Agent, or Firm* — Mannava & Kang, P.C.

(57) ABSTRACT

A containment assembly comprises a first enclosure comprising a cavity for receiving a hazardous object. The first enclosure is configured for containing an explosive event of the hazardous object. A second enclosure comprises a gas impermeable layer, an inner volume, and an air-tight closure. The second enclosure is configured for receiving and containing a gas byproduct of the explosive event from the first enclosure. A gas permeable barrier is disposed between the cavity of the first enclosure and the inner volume of the second enclosure. A smart insulation arrangement may be implemented on the lower side of the first enclosure to allow the event to happen and to cool down over a longer period of time without exceeding maximum allowable temperatures on the outside of the second enclosure. This permits the flight or journey to continue.

17 Claims, 14 Drawing Sheets

(51) Int. Cl.
*B65D 85/68* (2006.01)
*F42B 39/20* (2006.01)

(58) Field of Classification Search
USPC ................................................ 86/50; 89/1.13
See application file for complete search history.

(56) References Cited

U.S. PATENT DOCUMENTS

| | | | | |
|---|---|---|---|---|
| 6,813,986 | B1 * | 11/2004 | Tafoya .................... | F42D 5/045 86/50 |
| 7,712,405 | B2 * | 5/2010 | Toycen ................... | F42D 5/045 86/50 |
| 9,339,671 | B1 | 5/2016 | Raj et al. | |
| 2005/0257673 | A1 * | 11/2005 | Tafoya .................... | F42D 5/045 86/50 |
| 2006/0278069 | A1 * | 12/2006 | Ryan ....................... | F42B 33/06 86/50 |
| 2007/0039453 | A1 * | 2/2007 | Toycen ................... | F42D 5/045 86/50 |
| 2017/0274231 | A1 | 9/2017 | Burkett | |
| 2021/0379428 | A1 | 12/2021 | Tsutsui et al. | |

OTHER PUBLICATIONS

HighWaterInnovations.com [online], "Our Products: PlaneGard," available on or before May 7, 2021 via Internet Archive: Wayback Machine URL<http://web.archive.org/web/20210507182618/http://highwaterinnovations.com/products.html>, retrieved on Nov. 2, 2023, retrieved from URL<http://highwaterinnovations.com/products.html>, 5 pages.
GelTechSolutions.com [online], "ChargeSafe Case," upon information and belief, available no later than Aug. 8, 2022, retrieved on Nov. 2, 2023, retrieved from URL<https://geltechsolutions.com/fireice/product/fireice-shield-chargesafe-case/>, 2 pages.
Extended Search Report in European Appln. No. 21377389.6, dated Jan. 8, 2024, 7 pages.

* cited by examiner

Section B

C-C

SECTION E

SECTION F

SECTION G

SECTION H

Section I

Section J

Section K

Section L

METHOD AND ASSEMBLY FOR CONTAINING A HAZARDOUS OBJECT

CROSS-REFERENCE TO RELATED APPLICATION

This application claims the benefit of U.S. Provisional Application No. 63/395,921, filed Aug. 8, 2022, and titled "Method and Assembly for Containing a Hazardous Object," which is incorporated by reference.

TECHNICAL FIELD

The present disclosure relates to a containment assembly for receiving a hazardous object or an inert object that may become hazardous, and particularly, a containment assembly for safely containing an explosive event of an inert or hazardous object.

BACKGROUND

Lithium-ion battery thermal runaway occurs when a cell, or area within the cell, achieves elevated temperatures from thermal failure, mechanical failure, internal short-circuiting, external short-circuiting, or electrochemical abuse. Thermal runaway is not extinguishable; once started, the lithium-ion battery burns to completion. In many cases, thermal runaway starts with a smoking object and ends with an explosion, creating flames, scattering debris, and releasing noxious gases into the air. Lithium-ion battery thermal runaway can be especially dangerous in a closed environment, such as, for example, an airplane cabin during a flight, an office building, or a submarine. While existing devices may dampen an explosion of a lithium-ion battery, these devices do not compensate for the enormous volume of gas generated by evaporation of the cell material during the explosive event. Aside from creating toxic fumes, an explosive event on board an active flight creates a panic, exposes passengers to explosive debris and fire, and requires the pilot to make an emergency landing.

SUMMARY

The present disclosure relates to an assembly and method of safely managing incidents caused by thermal runaway of lithium ion battery powered devices. The assemblies and methods described herein provide a solution to an increasing concern of personal electronic devices ("PED") or lithium-ion battery packs exploding on board a flight or other location where immediate ventilation is impossible.

In accordance with a first aspect, a containment assembly may include a first enclosure comprising a cavity for receiving a hazardous object. The first enclosure may be configured for containing an explosive event of the hazardous object. A second enclosure may include a gas impermeable layer, an inner volume, and an air-tight closure. The second enclosure may be configured for receiving and containing a gas byproduct of the explosive event from the first enclosure. A gas permeable barrier may be disposed between the cavity of the first enclosure and the inner volume of the second enclosure.

In accordance with a second aspect, a method of containing a hazardous object may include receiving a hazardous object in a cavity of a first enclosure of a containment assembly. The method may include containing an explosive event of the hazardous object in the first enclosure, and receiving, in an inner volume of a second enclosure, a gas byproduct of the hazardous object from the explosive event through a gas permeable barrier. The gas permeable barrier may be disposed between the cavity of the first enclosure and the inner volume of the second enclosure. The method may include containing the gas byproduct in the inner volume of the second enclosure, the second enclosure comprising a gas impermeable body.

In accordance with a third aspect, an explosive containment enclosure may include a body defining a cavity for receiving a hazardous object and a wall at least partially surrounding the cavity. The wall may include a first layer of Aerogel-based material (e.g., Pyrogel), a second layer of Aerogel-based material, and a heat conductive material, such as a heat conductive metallic layer, disposed between the first and second layers of Aerogel-based material. The enclosure may be configured for containing an explosive event of the hazardous object.

In further accordance with any one or more of the foregoing first, second, and third aspects, a containment assembly, an explosive containment enclosure, and/or a method of containing a hazardous object may further include any one or more of the following aspects.

In one example, the inner volume of the second enclosure may be sized to receive the first enclosure.

In another example, the first enclosure may define the gas permeable barrier.

In other examples, the first enclosure may include an interior layer of a flame retardant material.

In an example, the first enclosure may include an embedded layer of a woven composite material.

In some examples, the first enclosure may include a layer of insulation.

In one form, a valve may be coupled to the second enclosure.

In another form, the first enclosure may include a fastening assembly.

In one example, the first enclosure may be movable between an open position, in which the cavity is accessible and the fastening assembly is disconnected, and a closed position, in which the fastening assembly is engaged.

In other forms, the fastening assembly may include a first mating structure and a second mating structure.

In another form, the first mating structure may be configured to lock the first enclosure when the second mating structure is in alignment.

In some forms, the first enclosure may have a flexible body.

In one example, the inner volume of the second enclosure may be expandable for containing a volume of gas in a range of approximately 50 liters to approximately 350 liters.

In another example, the first enclosure may be sealably coupled to the second enclosure.

In other examples, the gas permeable barrier may at least partially define the inner volume of the second enclosure.

In some examples, the second enclosure may be movable between a collapsed configuration and an expanded configuration.

In one form, the method may include controllably releasing the gas byproduct to atmosphere.

In another form, the method may include sealing the first enclosure around the hazardous object.

In other forms, the method may include placing the first enclosure inside the inner volume of the second enclosure.

In some forms, the method may include sealing the second enclosure, through a gas-tight closure, before receiving the gas byproduct.

In one example, containing the gas byproduct may include expanding a flexible body of the second enclosure as pressure increases inside the inner volume of the second enclosure.

In another example, receiving the hazardous object may include placing the hazardous object against a flame retardant layer of the first enclosure.

In one example, the first enclosure may include a flexible layer adjacent the flame retardant layer and an insulation layer adjacent the flexible layer.

In other examples, the method may include choosing the second enclosure based on a fire class of the hazardous object.

In some examples, the method may include unfolding the explosive containment assembly from a collapsed configuration.

In one form, each of the first and second layers of Aerogel-based material may have a thickness in a range of approximately 1 mm to approximately 10 mm.

In another form, the metallic layer may be a heat conductive metal.

In another form, the metallic layer may be aluminum foil.

In some forms, the aluminum foil may have a thickness in a range of approximately 50 μm to approximately 350 μm.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

The details of one or more implementations of the subject matter described in this disclosure are set forth in the accompanying drawings and the description below. Other features, aspects, and advantages of the subject matter will be apparent from the following detailed description, the drawings, and the claims.

DETAILED DESCRIPTION

The present disclosure relates to an assembly and method for safely containing a hazardous object, such as a personal electronic device ("PED") or lithium-ion battery pack, during an explosive event. In particular, containment assemblies provided and described herein may receive a PED experiencing lithium-ion thermal runaway, contain an explosion of the PED within the assembly, receive a large volume of noxious gas and smoke produced from the explosive event, and safely release the gas from the containing assembly in a controllable manner. The containment assemblies are also useful for secondary fires of a PED or other incendiary or explosive objects. As used herein, a PED may refer to a notebook, tablet computer, smartphone, e-cigarette, media player, communication device, lithium-ion battery pack, or other devices that use lithium-ion batteries and/or susceptible to thermal runaway. A hazardous object, as used herein, may refer to any PED or other normally inert object that can become hazardous in some circumstances.

Figure 1:
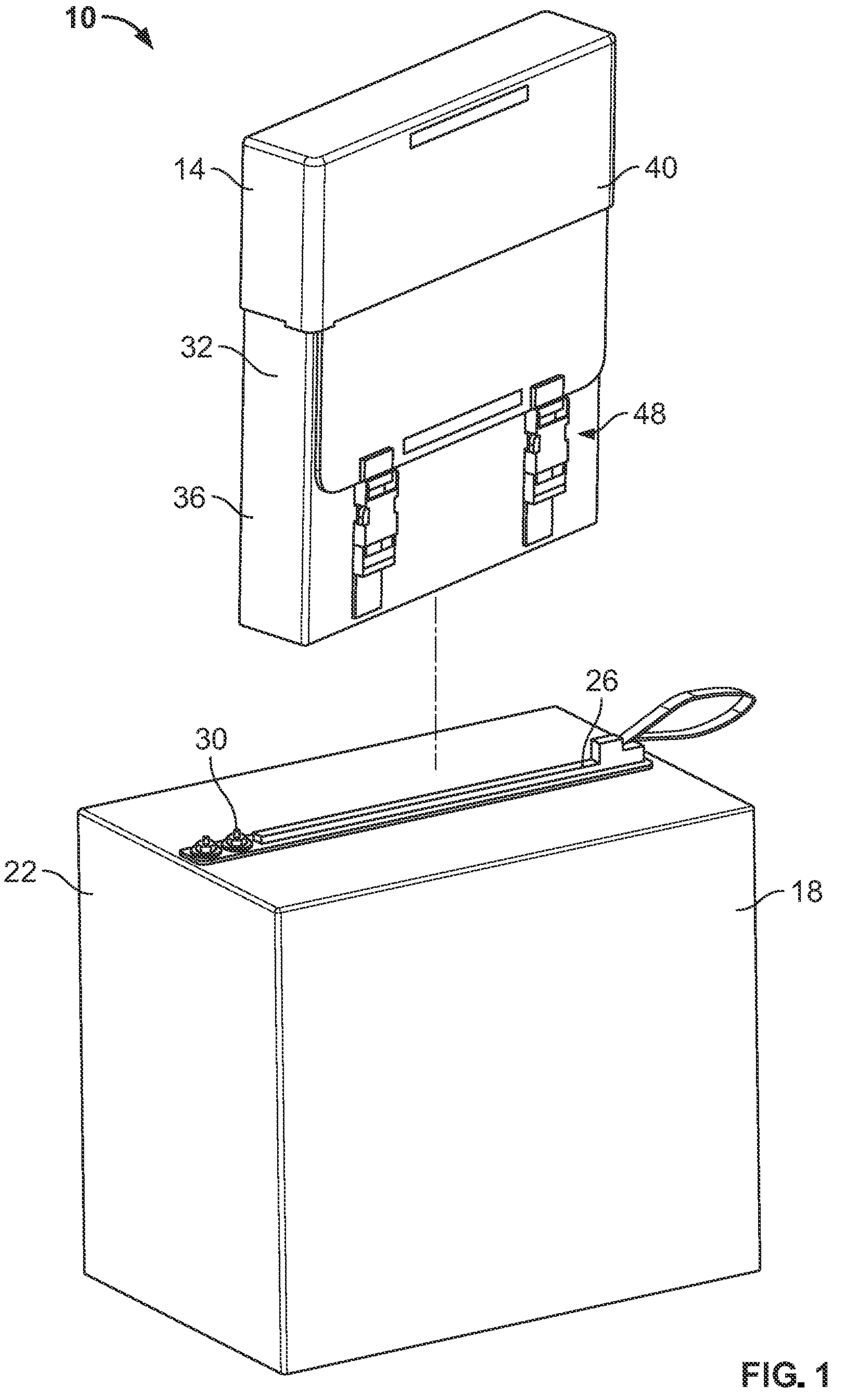
FIG. 1 is an exploded, perspective view of a containment assembly in accordance with the teachings of the present disclosure.

In FIG. 1, a first example containment assembly 10 includes a first enclosure 14 and a second enclosure 18 that receives the first enclosure 14. The first enclosure 14 has a cavity or volume that is sized for receiving a hazardous object (e.g., any PED class 1-4), such as, for example, a PED experiencing thermal runaway. The second enclosure 18 has a gas impermeable layer 22, an inner volume, and an air-tight closure 26 or closing device. The second enclosure 18 is configured for completely receiving the first enclosure 14, and containing a gas byproduct of the explosive event from the first enclosure 14 within the inner volume. In some examples, the second enclosure 18 includes one or more relief valves 30 or other predetermined breaking point to assure a controlled explosion-free relief in case of overpressure inside the second enclosure 18. A gas permeable barrier 32, which in this example is a wall (e.g., an upper wall) of the first enclosure 14, is disposed between the cavity of the first enclosure 14 and the inner volume of the second enclosure 18 to permit the gas byproduct of the explosive event to pass into the inner volume of the second enclosure 18. By allowing the gas byproduct to escape to the inner volume of the second enclosure 18, the containment assembly 10 minimizes pressure build-up in the first enclosure 14 while sealing off toxic gases and smoke from the surrounding environment.

In the locked and closed position shown in FIG. 1, the first enclosure 14 is configured to contain an explosive event of the hazardous object, so that the first enclosure 14 can withstand a large increase in pressure and temperature, and contain all pieces of the exploded object, burning debris, and flames within the cavity of the first enclosure 14. The first enclosure 14 has a permeable body on the upper side, but does not allow the flame to receive oxygen and therefore can put out any fire created during the explosion. After an explosive event, a large volume of gas is generated and passes through the upper wall 32 of the first enclosure 14 and into the inner volume of the second enclosure 18. The second enclosure 18 is expandable to receive a large volume of gas byproduct or smoke, yet is also foldable for storage in, for example, an overhead storage bin of an airplane. The gas impermeable layer 22 of the second enclosure 18 prevents any noxious gas byproduct from leaking out of the containment assembly 10 and into the surrounding environment. As described further below, pressure relief valves are integrated with the second enclosure 18 to avoid the impermeable layer 22 from ripping or exploding in an overpressure situation. In such a situation, the pressure relief valves (or other predetermined breaking point) are configured to release the necessary volume of gas in a controlled manner to relieve the internal pressure and avoid an uncontrolled rupture or explosion of the second enclosure 18 if the equipment is used with a larger PED than designed (misuse).

In some implementations, the second enclosure may collapse by deflating and retracting to its original size elastically or may collapse plastically. The second enclosure expands to provide a large interior volume, and in some examples, unfolds as the interior volume fills with gas.

In the illustrated example, the first enclosure 14 is separable from the second enclosure 18, yet used together as an assembly. In other examples, the first enclosure 14 may be connected to the second enclosure 18 by straps or another coupling mechanism so that the first enclosure 14 is pre-inserted in the second enclosure 18.

Figure 2:
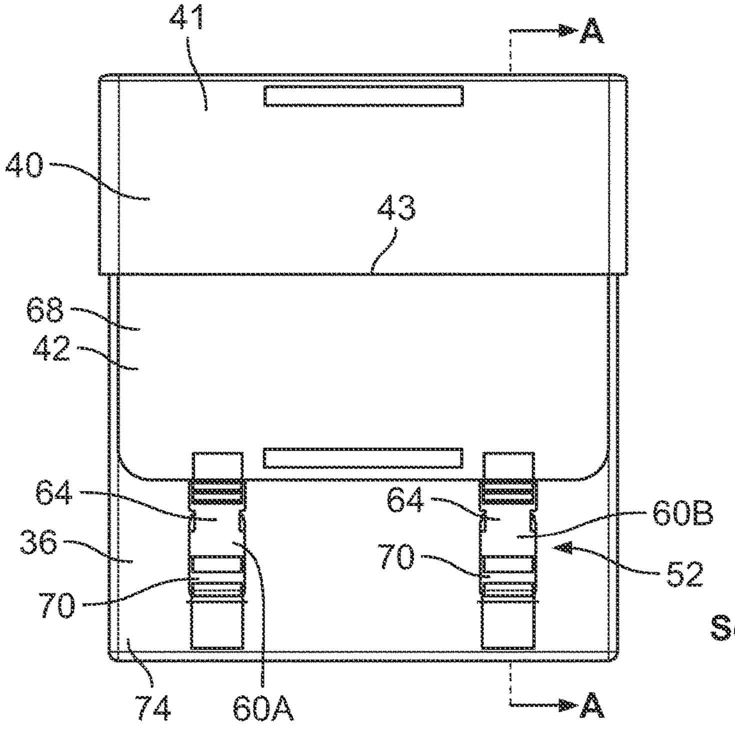
FIG. 2 is a front view of a first enclosure of the containment assembly of FIG. 1.
Figure 3:
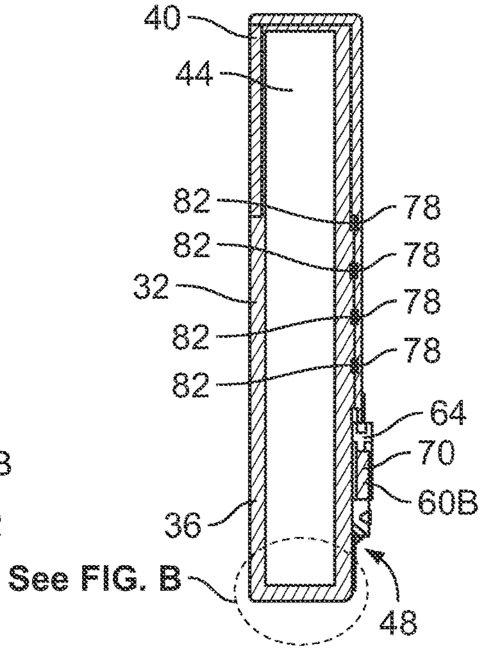
FIG. 3 is a cross-sectional view of the first enclosure, taken at A-A of FIG. 2.
Figure 4:
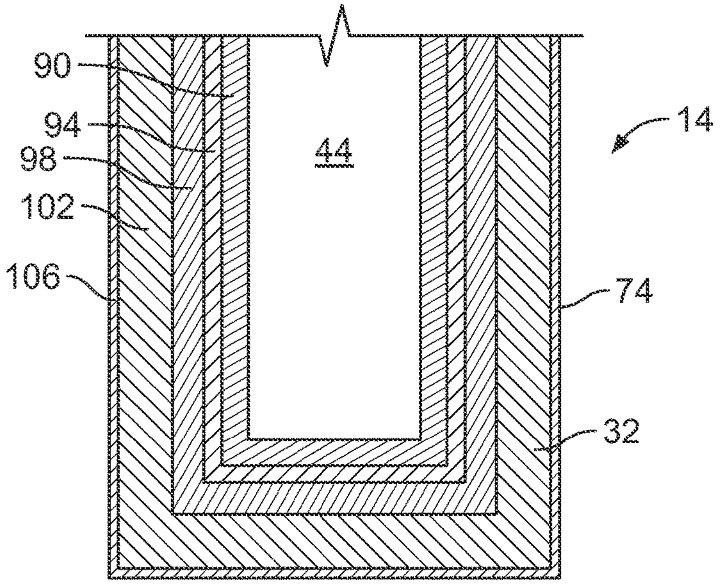
FIG. 4 is a magnified cross-sectional view of the first enclosure, taken at section B of FIG. 3.

Turning to FIGS. 2-4, the first enclosure 14 is a fire-proof, flexible bag with a body 36, a movable flap 40, a cavity 44, and a fastening assembly 48 that locks the body 36 to the flap 40. In the closed position, shown in FIGS. 2 and 3, the flap 40 and body 36 together define the cavity 44 that is sized to receive one or more PEDs of various sizes. The first enclosure 14 is movable between a closed position, in which the flap 40 sealably couples and locks to the body 36 using the fastening assembly 48, and an open position, in which the flap 40 is disengaged from the body 36 and uncovers the cavity 44. In FIG. 2, the flap 40 is double-paneled with a first panel 41, a second panel 42, and a seam 43 connecting the first and second panels 41, 42. As described further below, the second portion 42 of the flap 40 matingly couples to the body 36 when the first enclosure 14 is in the locked configuration. The flap 40 provides an extra layer of protection by overlapping with the body 36. However, in other examples, such as a variation first enclosure 14A of FIG. 5, the flap 40A is a single-paneled flap.

When the fastening assembly 48 is locked and secured, the first enclosure 14 can contain any explosion it is designed for (e.g., UL classes 1-4), meaning that no debris or flame can escape the first enclosure 14. Accordingly, the fastening assembly 48 is sufficiently durable to withstand a sudden increase in pressure and temperature within the cavity 44 of the first enclosure 14. In FIGS. 2 and 3, the fastening assembly 48 includes a first mating structure 52 and a second mating structure 56 that together sealingly and securely fasten the first enclosure 14 in the locked configuration. The first mating structure 52 includes first and second couplers 60A, and each coupler 60A, 60B has a first buckle 64 attached to an outer surface 68 of the flap and a second buckle 70 attached to an outer surface 74 of the body 36. Specifically, the first buckle 64 is a female buckle and is attached to the second panel 42 of the flap 40 and the second buckle 70 is a male buckle. However, in other examples, the first buckle 64 may be a male buckle and the second buckle 70 may be a female buckle.

The second mating structure 56 illustrated in the cross-section in FIG. 3 includes a first mating portion 78 attached to the flap 40 and a second mating portion 82 attached to the body 36. Specifically, the first mating portion 78 is disposed on an interior surface (or surface facing the body 36 when closed) of the second panel 42 of the flap 40 and engages with the second mating portion 82 disposed on the outer surface 74 of the body 36. In one example, the second mating structure 56 includes a pair of fastening strips that define the first mating portion 78 and second mating portion 82, and when the mating portions 78, 82 are pressed together, the second mating structure 56 creates a seal between the flap 40 and the body 36. The second mating structure 56 in the illustrated example includes a strip of hook tape defining the first mating portion 78 and a strip of loop tape defining the second mating portion 82 that allow for minor adjustments while engaging the buckles 64, 70 of the first mating structure 52. However, in other examples, the second mating structure 56 may include a plurality of spaced apart pairs of hook and loop fastening strips disposed between the flap 40 and the body 36.

In this arrangement, the first mating structure 52 is configured to engage only when the first and second mating portions 78, 82 (i.e., of each pair) of the second mating structure 56 are aligned and fastened. If, for example, the first mating portion 78 is off-center or misaligned with the second mating portion 82, or is attached to a different second mating portion pair, the first and second couplers 60A, 60B (e.g., female and male buckles) of the first mating structure 52 cannot lock. Accordingly, the fastening assembly 48 of the first enclosure 14 provides a visual and physical indicator to a user when the first enclosure 14 is (or is not) properly closed and secure. While the first and second mating structures 52, 56 of the present example utilizes multiple female-male mating connector assemblies (i.e., buckles, hook-and-loop), other versions of the disclosed assembly 10 can securely lock the flap 40 and body 36 in different ways, such as, for example, adhesive, links, snaps, a lock-and-key arrangement, threaded engagement, other suitable methods, and/or a combination of methods and mechanisms. Further, in other examples, the first mating structure 52 may have one coupler or more than two couplers, and the second mating structure 56 may include fewer or more than four mating pairs between the flap 40 and body 36.

Figure 5:
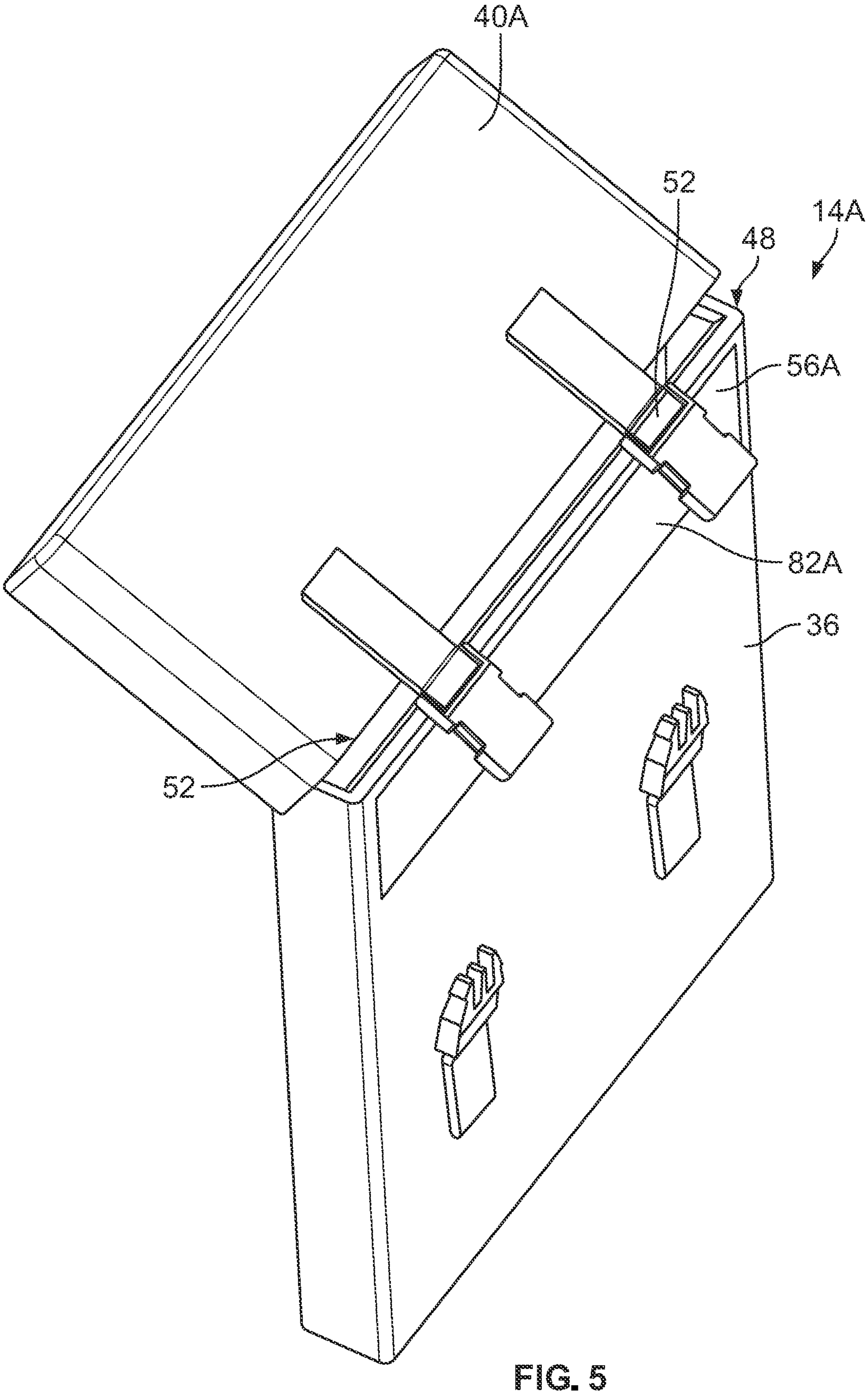
FIG. 5 is a perspective view of a variation of the first enclosure of FIG. 1, showing the first enclosure in an open position.

Turning briefly to FIG. 5, a variation of the first enclosure 14A of FIGS. 1-4 is illustrated. In this variation, the first enclosure 14A defines a single-paneled flap 40A and a second mating structure 56A, including one pair of hook-and-loop fasteners (i.e., one strip of hooks 82A on the body 36 and one strip of loops on the flap 40A). It will be appreciated that all other features and functions of the first enclosure 14A of FIG. 5 are the same, or substantially similar to, the features and functions of the first enclosure 14 of FIGS. 1-4 as described above. Accordingly, the containment assembly 10 of FIG. 1 may include the variation of the first enclosure 14A paired with the second enclosure 18 to safely contain an explosive event.

Turning back to FIG. 4, the wall 32 of the first enclosure 14 has a plurality of layers 94, 98, 102, 106 that together form an explosion proof bag. A first layer 90 is a flame retardant material, such as, a nonwoven carbon felt/fleece material with high temperature resistance (e.g., CarbonX felt). The first layer 90 is an interior layer of the wall 32 and is adjacent to the cavity 44 of the first enclosure 14. The first layer 90 is constructed to withstand a local temperature of a PED-fire of up to 1200° C. A second layer 94 is a woven composite material and is embedded between the interior layer 90 and the outer surface 74. The second layer 94 may be, for example, a loosely woven Kevlar, glass fiber knitted fabric, or other woven composite material that is constructed to withstand forces of an explosion, catch debris, and weather high temperatures. A third layer 98 adjacent to the second layer 94 is a layer of insulation that may be, for example, non-woven permeable glass- or silica fiber, such as a white silica. A fourth layer 102 may also be a layer of insulation that may be, for example, a white silica non woven material. A fifth and outer layer 106 of the wall 32 a flame resistant flexible material (e.g., Indura®). The plurality of layers of the first enclosure 14 may be stitched or sewn together using a fireproof thread.

In the illustrated example, the third layer 98 (or internal layer of insulation) may have different material properties than the fourth layer 102 (or outer layer of insulation) such as, for example, weight (e.g., the third layer 98 may be 16 oz and the fourth layer 102 may be 22 oz). Varying the weight and/or thickness of each of the layers of insulation 98, 102 provides thermal advantages and physical support to hold different weights of one or more PEDs. In other words, the thicker or heavier the layer of insulation, the more weight the first enclosure 14 can support without deforming or compressing any of the layers 90, 94, 98, 102, 106 of the wall 32. The layers of insulation 98, 102 are composed of a material that does not compress under the weight of the PED. In other examples, the layers of insulation 98 and 102 may be different materials, but with similar insulation properties to white silica non-woven material.

While each of the plurality of layers 90, 94, 98, 102, 106 of the wall 32 is slightly permeable to allow gases to pass through (and to avoid internal pressure build-up), the layers 90, 94, 98, 102, 106 of the wall 32 block any flames from passing through the first enclosure 14. The body 36 also prevents the flames from oxygenating and growing. So constructed, the first enclosure 14 is compliant and fireproof up to 1200 degrees C.

Figure 8:
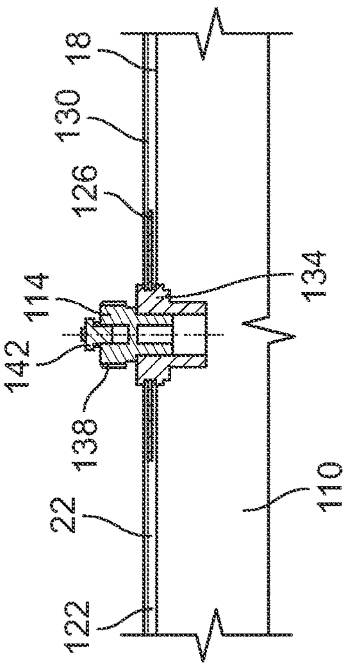
FIG. 8 is a magnified, cross-sectional view of a relief valve of the second enclosure, taken at C-C of FIG. 6.
Figure 6:
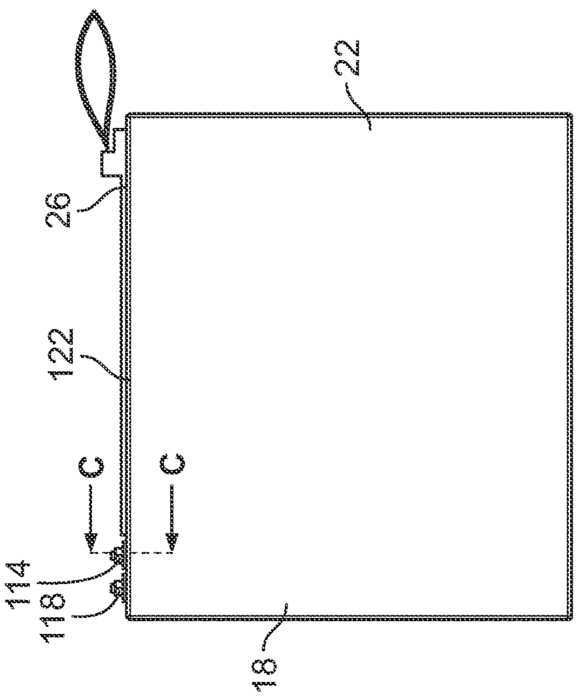
FIG. 6 is a front view of a second enclosure of the containment assembly of FIG. 1.
Figure 7:
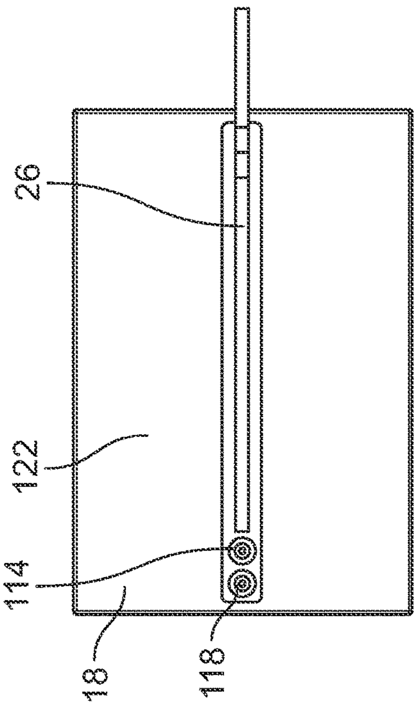
FIG. 7 is a top view of the second enclosure of FIG. 6.

In FIGS. 6, 7, and 8, the second enclosure 18 of the containment assembly 10 of FIG. 1 is an air-tight and water-tight flexible bag 18 capable of receiving gas byproduct from an explosion. The second enclosure 18 defines the gas impermeable wall 22 made of a welded, fire-retardant PVC or similar material. An inner volume 110 (FIG. 8) of the second enclosure 18 is expandable for containing a volume in a range of approximately 50 liters or more (e.g., about 100 liters or more, or about 150 liters or more) to approximately 350 liters or less (e.g., about 300 liters or less, about 250 liters or less, or about 200 liters or less). The volume is dependent on the class of PED the assembly is intended for, and is scalable for different sizes and classes of PEDs. The wall 22 of the second enclosure 18 is flexible and relatively thin to permit folding around the first enclosure 14 to minimize overall size of the containment assembly 10 for storage. The closing device 26 is a watertight and airtight zipper that is welded to the bag 18. Two one-way relief valves 114, 118 or other predetermined breaking points are installed adjacent to the closing device 26 at a top portion 122 of the second enclosure 18. Each valve 114, 118 is embedded in the bag and may release internal pressure in an overpressure situation to prevent the second enclosure 18 from uncontrolled bursting. The second enclosure 18 may be emptied through first and second relief valves 114, 118 or by opening the closing device 26 or by partly opening the closing device 26. After the bag 18 is emptied, the bag 18 can be folded and stored. In some examples, a filter may be positioned over the plug 138 of each valve 114, 118 or into the partly opened closing device 26 to filter noxious gases as they pass through the openings of the valves 114, 118.

Turning to FIG. 8, the first pressure relief valve 114 is integrated into the top portion 122 of the second enclosure 18 and, when closed, provides a fluid tight seal between the inner volume 110 of the second enclosure 18 and the environment. The valve 114 includes an annular flange 126 disposed beneath an outer layer 130 of the second enclosure 18, positioning an adapter body 134 partially within the inner volume 110 of the bag 18, and partially outside the bag 18. A valve plug 138 is threadably coupled to the adapter body 134 and may be manually rotated to open the valve 114. Generally, the valve plug 138 remains closed. In an overpressure situation, a bleed valve 142 that is coupled to the valve plug 138 may open (e.g., automatically) when a certain internal pressure limit is met (e.g., when the gas volume exceeds the inner volume 110 of the bag 18). Other types of relief valves may be used instead of, or in combination with, one or more of the illustrated relief valves 114, 118. While two relief valves 114, 118 permit more gas to escape at a controlled rate, in other examples a larger relief valve may be provided instead of the two. It will be appreciated that the details of the relief valve 114 may apply equally to the second relief valve 118.

Figure 9:
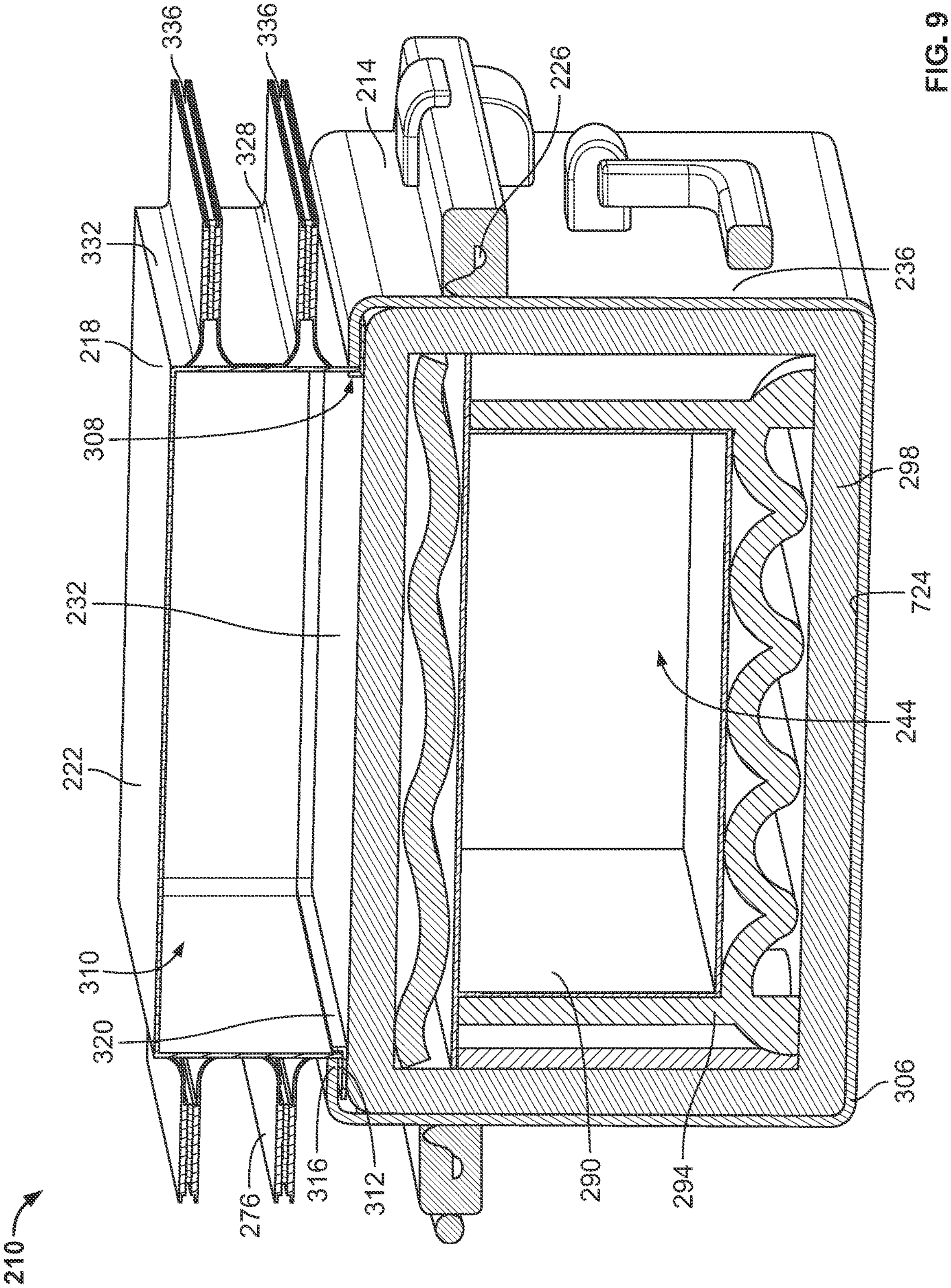
FIG. 9 is a partial, perspective view of a different containment assembly in accordance with the teachings of the present disclosure.

FIG. 9 illustrates a second example containment assembly 210 for containing an explosive event of a hazardous object.

The second example containment assembly 210 is similar to the containment assembly 10 of FIGS. 1-8, but includes a different enclosure arrangement for containing an explosive event. Like the first containment assembly 10, the second example containment assembly 210 includes a first enclosure 214, a second enclosure 218, and a gas permeable barrier 232 disposed between the first and second enclosures 214, 218. Thus, for ease of reference, and to the extent possible, the same or similar components of the second example containment assembly 210 will retain the same reference numbers as outlined above with respect to the first example containment assembly 10, although the reference numbers will be increased by 200. However, the second example containment assembly 210 differs from the first example containment assembly 10 in the manner discussed below.

Unlike the first example containment assembly 10, the second example containment assembly 210 does not include completely nesting enclosures. Rather, the first enclosure 214 is positioned adjacent to, and not easily removable from, the second enclosure 218. Similar to the first enclosure 14 of FIGS. 1-5, the first enclosure 214 of FIG. 9 has a cavity or volume 244 that is sized for receiving a hazardous object, such as, for example, a PED experiencing thermal runaway. The first enclosure 214 is configured for completely receiving and containing any UL class fire it is designed for. The second enclosure 218 defines a gas impermeable layer 222 and an inner volume 310. The second enclosure 218 is configured for completely receiving and containing all gas byproducts of an explosive event from the first enclosure 214. The gas permeable barrier 232, which in this example is a layer of material of the first enclosure 214, is disposed between the cavity 244 of the first enclosure 214 and the inner volume 310 of the second enclosure 218 to permit the gas byproduct of the explosive event to pass into the inner volume 310 of the second enclosure 218.

Generally speaking, an outer layer or wall 306 of the first enclosure 214 has a rigid shell similar to an airtight safety box made from heavy-duty plastic. A cut-out 308 in a lid 240 of the first enclosure 214 is sized to receive an inlet portion 312 of the second enclosure 218. The inlet portion 312 of the second enclosure 218 is coupled to the lid 240 of the first enclosure 214 using a seal 316 and a frame 320 coupled to the lid 240. The seal 316 is disposed between the frame 320 and the inlet portion 312 of the second enclosure 218 to seal the first enclosure 214 to the second enclosure 218. Further, the first enclosure 214 includes a closing device 226 with a seal and interlocking profile. Alternatively, the connection between 214 and 222 may be established by welding or by an adhesive bonding process where the hard shell material of the first enclosure and the flexible material of the second enclosure are PVC.

The first enclosure 214 has a first layer 290, a second layer 294, a third layer 298, and a fourth or outer layer 306. The first, second, and third layers 290, 294, 298 are attached to an interior wall 324 of a body 236. The first layer 290 is a fireproof material layer, and the second and third layers 294, 298 are layers of insulation. The second layer is an inner layer of insulation 294, and may be, for example, 10 mm thick pipe form, and the third layer is an outer layer of insulation 298, and may be, for example, 15 mm thick pipe form. The wavy construction of the inner layer of insulation 294 resists compression from the weight of the received object(s) disposed in the cavity 244. The fourth layer 306 is the rigid shell of the body 236. The gas permeable barrier 232, which is also the outer layer of insulation of the first enclosure 214, at least partially defines the inner volume 244 of the second enclosure 218. The layers of the first enclosure 214 are strong enough to withstand the forces from the explosion, yet permeable in a direction toward the second enclosure 218 to allow gases to pass through the gas permeable barrier 232 and into the volume 310 of the second enclosure 218. By permitting gas flow into the second enclosure 218, the containment assembly 210 avoids any pressure build-up in the body 236 of the first enclosure 214. The fireproof and insulation layers 290, 294, 298 may be stitched as a bag and glued to the rigid shell 306 of the body 236.

The second enclosure 218 is a flexible, expandable bag that receives and contains the gas byproduct of the explosion in the first enclosure 214. The second enclosure 218 is pleated with an airtight PU/PVC coating or other similar coating. The second enclosure 218 has a first portion 328 defining the inlet portion 312 and a second portion 332. The first and second portions 328, 332 of the second enclosure 218 are collapsible for storage, and may be folded and kept in a pleated configuration using a hook and loop mating structures 336 attached to the exterior surface 276. To scale-up the design for larger PEDs or higher class PEDs, the second enclosure 218 may include additional portions that unfold in parallel or sequentially with the other portions.

Figures 10, 11, 12:
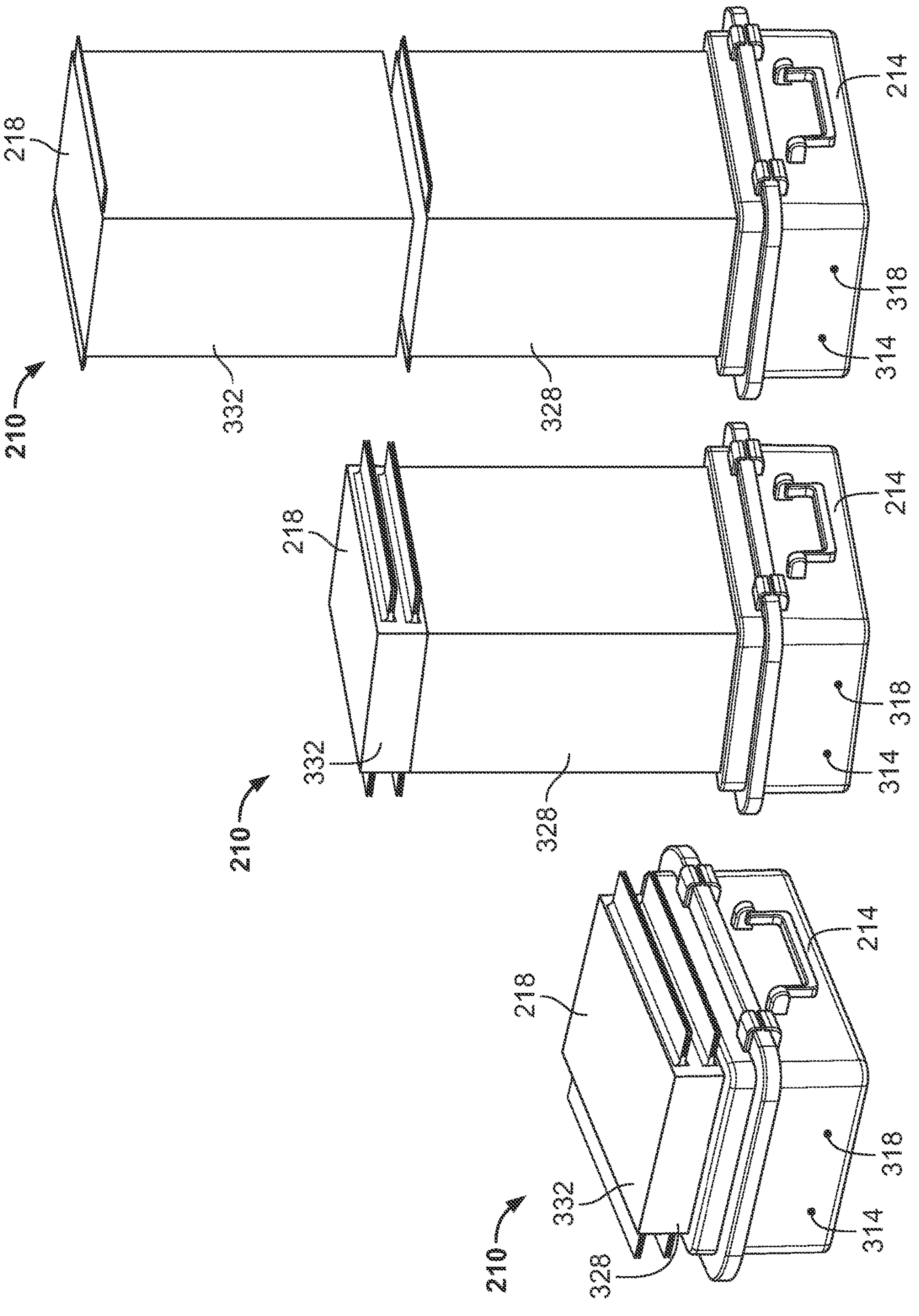
FIG. 10 is a perspective view of the containment assembly of FIG. 9, showing the containment assembly in a collapsed configuration.
FIG. 11 is a perspective view of the containment assembly of FIG. 10, showing the containment assembly in a partially inflated configuration.
FIG. 12 is a perspective view of the containment assembly of FIG. 10, showing the containment assembly in an inflated configuration.

Turning now to FIGS. 10, 11, and 12, the second enclosure 218 is movable between a collapsed configuration and an expanded configuration. Specifically, the second enclosure 218 is movable to an intermediate expanded configuration, shown in FIG. 11, and a fully expanded configuration as shown in FIG. 12. After an explosive event, gas permeates through the gas permeable barrier 232 separating the first and second enclosures 214, 218, and into the inner volume 310 of the second enclosure 218. As gas fills the second enclosure 218, the second enclosure 218 inflates based on the gas received in the inner volume 310. In FIG. 11, the first portion 328 of the second enclosure 218 expands to a first volume. When the first portion 328 is completely inflated, the expansion force of the gas contained in the inner volume 310 will force the hook and loop coupler 336 to disengage and permit the second portion 332 to inflate to accommodate the additional gas, as shown in FIG. 12. This configuration is particularly useful to avoid overpressure. However, in an overpressure situation, two overpressure valves 314, 318 or other predetermined breaking points installed in first enclosure 214 may release gas to prevent the second enclosure 218 from uncontrolled bursting. The valves 314, 318 or other predetermined breaking point may be the same or similar to the valves 114, 118 of the first containment assembly 10. While the second enclosure 218 of FIGS. 10-12 expands into a rectangular column, in other examples, the second enclosure 218 may expand in a different direction and/or in a different shape or configuration.

Figure 13:
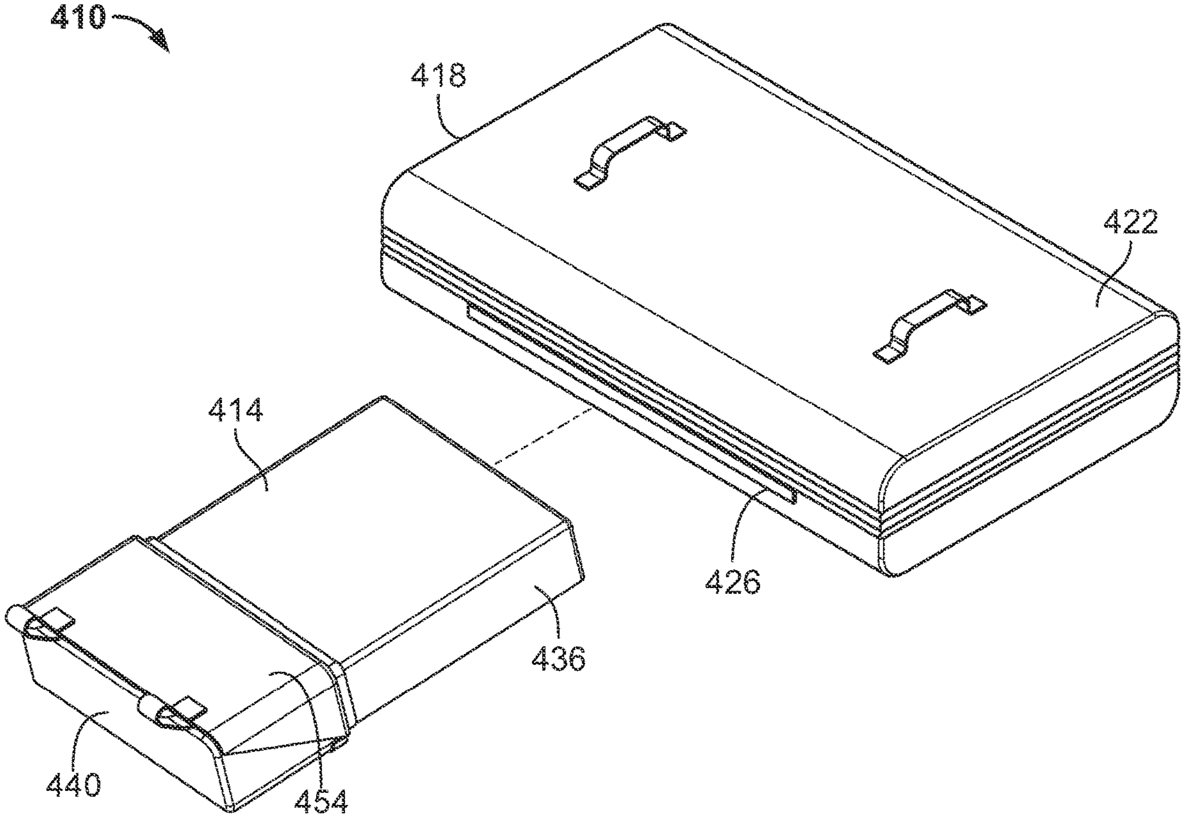
FIG. 13 is an exploded, perspective view of a different containment assembly in accordance with the teachings of the present disclosure.
Figure 14:
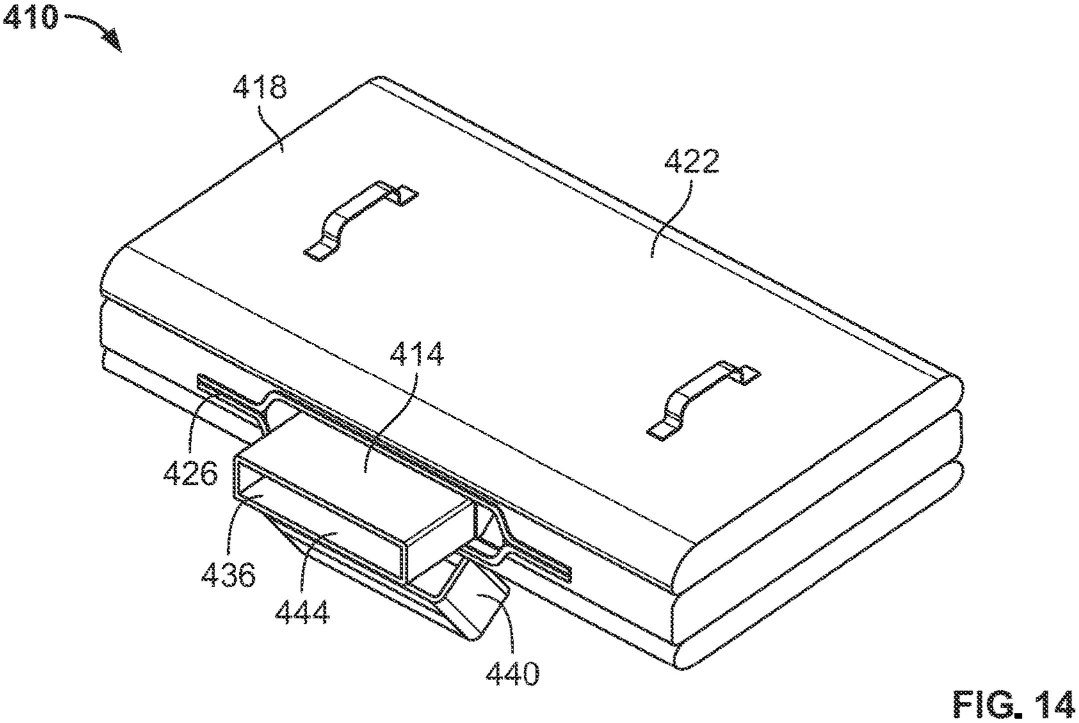
FIG. 14 is a perspective view of a first enclosure partially disposed in a second enclosure of the containment assembly of FIG. 13.

FIGS. 13 and 14 illustrate a third example containment assembly 410 for containing an explosive event of a hazardous object. The third example containment assembly 410 is similar to the containment assembly 10 of FIGS. 1-8, but includes a different enclosure arrangement for containing an explosive event, while the overall principle stays the same as in both the first and second examples. Like the first containment assembly 10, the third example containment assembly 410 includes a first enclosure 414 and a second enclosure 418 that receives the first enclosure 414. Thus, for ease of reference, and to the extent possible, the same or similar components of the second example containment assembly 410 will retain the same reference numbers as outlined above with respect to the first example containment assembly 10, although the reference numbers will be increased by 400. However, the second example containment assembly 410 differs from the first example containment assembly 10 in the manner discussed below.

In FIG. 14, the containment assembly 410 is arranged in a pre-assembled configuration ready to receive a hazardous object. The first enclosure 414 is in an open position, disposed through an open closure device 426 of the second enclosure 418, and coupled to a coupling mechanism disposed on an interior surface of the second enclosure 418. While the first and second enclosures 414, 418 couple to facilitate receiving a hazardous object in a pre-assembled configuration, the first enclosure 414 may be placed within the second enclosure 18 of the first example container assembly 10, and the second enclosure 418 may receive the first enclosure 14 of the first example container assembly 10.

Figure 16:
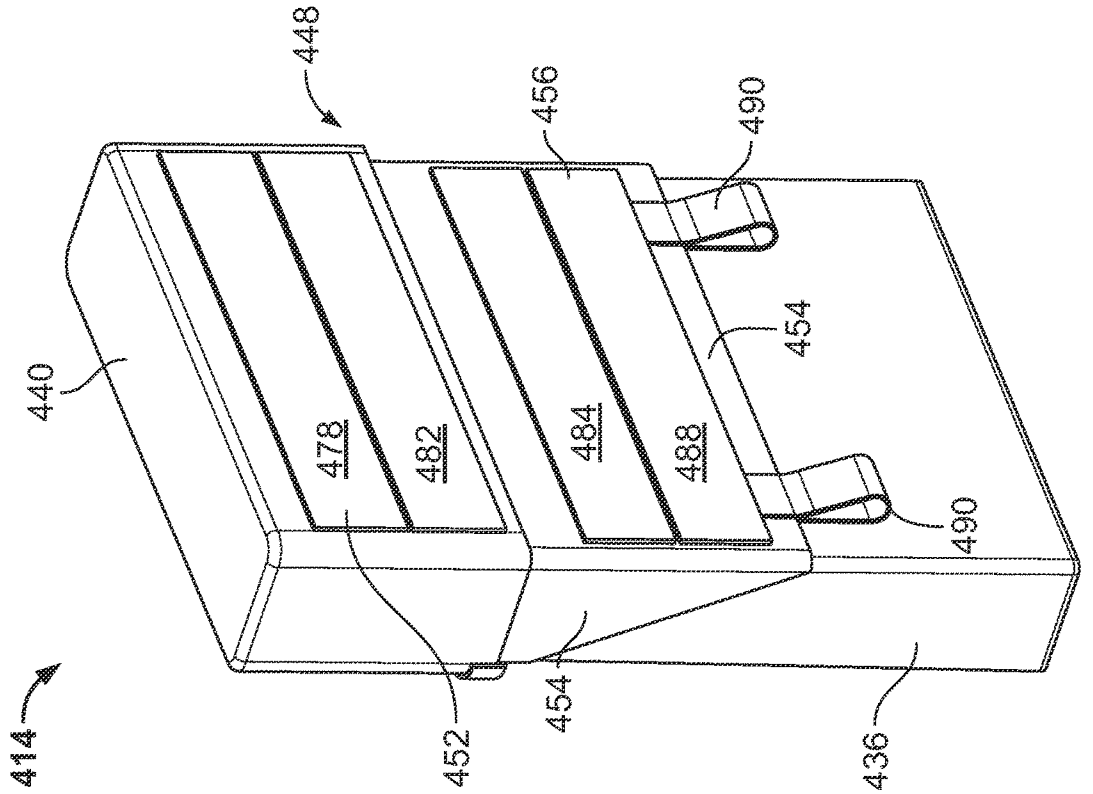
FIG. 16 is a perspective view of the first enclosure of FIG. 13, showing the first enclosure in a partially closed configuration.
Figure 15:
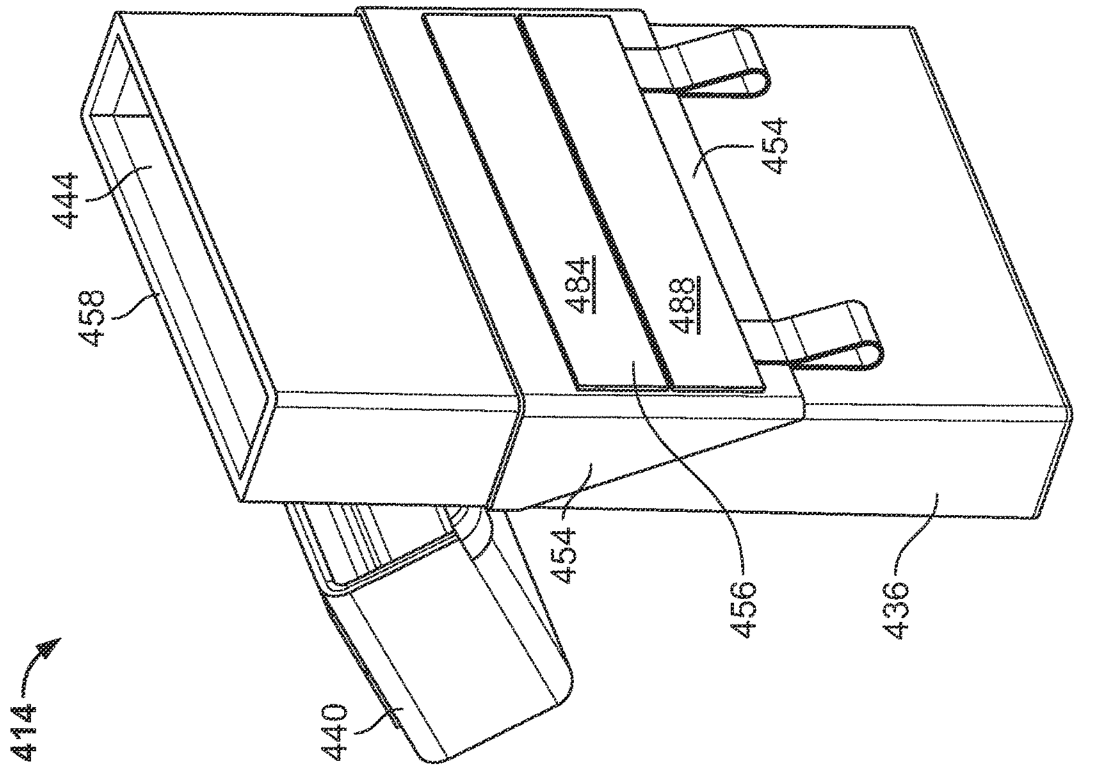
FIG. 15 is a perspective view of the first enclosure of FIG. 13, showing the first enclosure in an open configuration.
Figure 17:
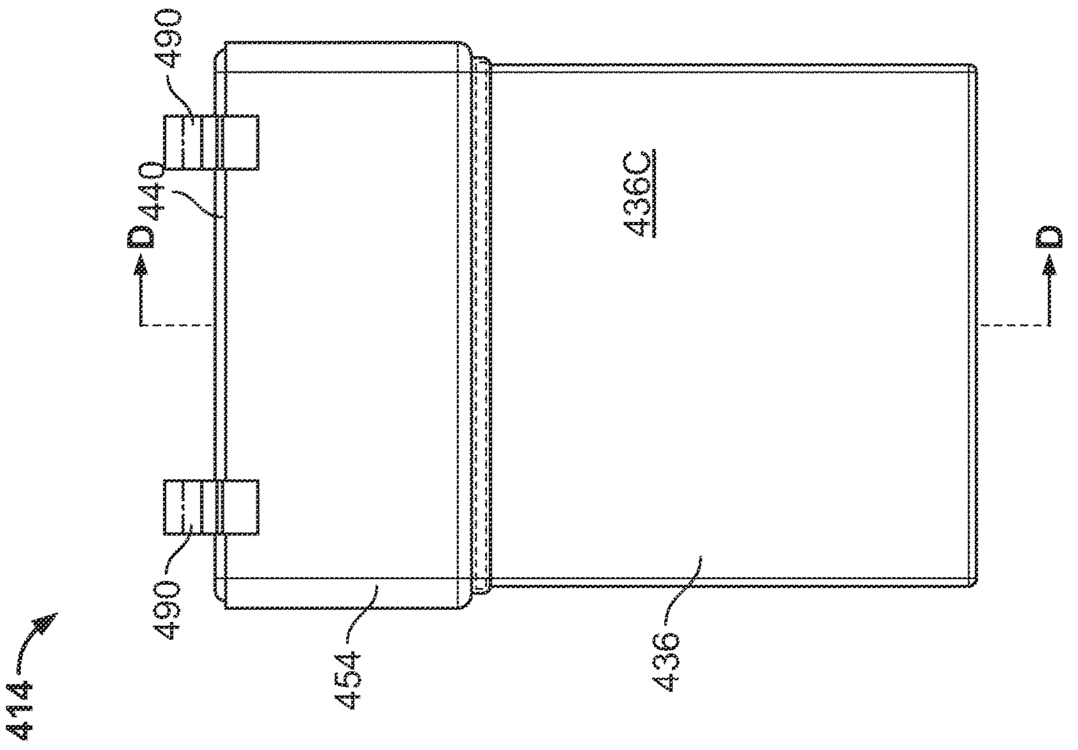
FIG. 17 is a front view of the first enclosure of FIG. 13, showing the enclosure in the closed configuration.

Turning to FIGS. 15-17, the first enclosure 414 is illustrated in various stages of closing. The first enclosure 414 includes a body 436, a hood 440, and a flap 454. In FIG. 15, the first enclosure 414 is open with both the hood 440 and flap 454 spaced from an opening 458 of the first enclosure 414. In FIG. 16, the first enclosure 414 is partially closed with the hood 440 covering the opening 458, and the fastening assembly 448 disengaged. The fastening assembly 448 includes a first mating structure 452 disposed on an exterior surface of the hood 440 and the second mating structure 456 disposed on an interior surface of the flap 454. The first mating structure 452 includes first and second mating portions 478, 482 that are configured to mate with corresponding first and second mating portions 484, 488 of the second mating structure 456. In one example, each of the mating structures 452, 456 includes a pair of fastening strips that mate with the corresponding mating portions when they are pressed together, thereby creating a seal. In the illustrated example, the first mating portions 478 and 484 are strips of hook tape and the second mating portions 482, 488 are strips of loop tape. When the flap 454 is lifted over the hood 440, the first mating portion 478 of the first mating structure 452 engages with the second mating portion 488 of the second mating structure 456, and the second mating portion 482 of the first mating structure 452 engages with the first mating portion 484 of the second mating structure 456. So configured, the flap 454 will not sealingly engage with the hood 440 unless opposing mating structures are adequately aligned and coupled. Accordingly, the fastening assembly 448 of the first enclosure 414 provides a visual and physical indicator to a user when the first enclosure 414 is (or is not) properly closed and secured.

While the first and second mating structures 452, 456 of the present example utilizes multiple female-male mating connector assemblies (i.e., hook-and-loop fastening tape), other versions of the disclosed assembly 410 can securely lock the hood 440 and flap 454 in different ways, such as, for example, buckles, adhesive, links, snaps, a lock-and-key arrangement, threaded engagement, other suitable methods, and/or a combination of methods and mechanisms. In yet other examples, the mating structures 452, 456 may include a plurality of spaced apart pairs of hook and loop fastening strips disposed between the hood 440 and the flap 454.

As shown in FIG. 17, the flap 454 is disposed upward relative (relative to the orientation of FIG. 17) and over the first mating structure 452 of the hood 440. The flap 454 is made of a slightly flexible material that allows for stretching to turn outside-in as the flap 454 moves from the position in FIG. 16 to the position in FIG. 17 (or inside-out from the position of FIG. 17 to the position of FIG. 16). The flap 454 includes two pull straps 490 to facilitate lifting the flap 454 up and over an exterior surface of the hood 440. In one example, the flap 454 includes a silicone coated Kevlar twill, but may be another suitable material that is both flexible and resilient in other examples. The function of this flap 454 is to provide a form fitting seal in order to close possible gaps on the lower end of the hood 440.

Figure 18:
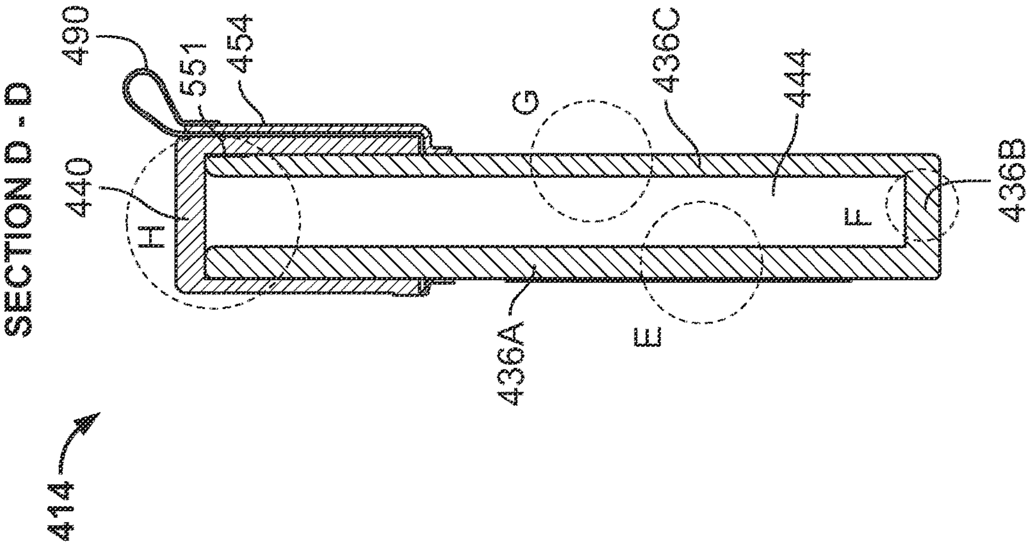
FIG. 18 is a cross-sectional view of the first enclosure of FIG. 13, taken at D-D of FIG. 17.
Figure 19:
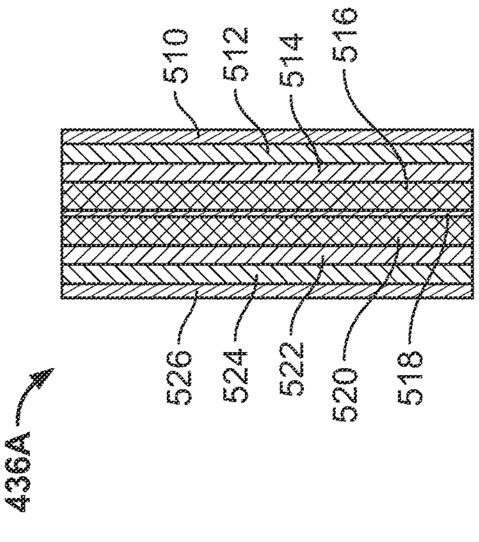
FIG. 19 is a magnified, cross-sectional view of the first enclosure, taken at section E of FIG. 18.

Turning to FIGS. 18-22, the body 436 of the first enclosure 414 varies in structural composition at different locations. A back wall 436A of the first enclosure 414 is configured for supporting the weight and explosion of the hazardous device. In FIG. 19, a first layer 510 of the back wall 436A is a flame-retardant material, such as a non-woven carbon felt/fleece material with high temperature resistance (e.g., CarbonX felt). The first layer 510 is an interior layer of the wall 436A that is adjacent to the cavity 444 of the first enclosure 414. The first layer 510 is constructed to withstand a local temperature of a PED-fire of up to 1200° C. A second layer 512 is a woven composite material, and may be, for example, a dense mineral coated fiberglass fabric with silica that is impermeable, a glass fiber knitted fabric such as a loosely woven Kevlar (e.g., ARMATEX® Firestar 35 fiberglass) or other woven composite material that is constructed to withstand forces of an explosion, catch debris, and withstand high temperatures. A third layer 514 adjacent to the second layer 512 is a layer of insulation that may be, for example, scrim glass or a white silica non-woven material. A fourth layer 516 is a layer of Aerogel-based material, for example, an Aerogel coated fiberglass blanket (e.g., Pyrogel® XTE). A fifth layer 518 is a fluid-tight, heat conductive material, such as a heat conductive metallic layer, such as Aluminum foil. A sixth layer 520 of the body 436A is a second layer of Aerogel-based material, for example, an Aerogel coated fiberglass blanket (e.g., Pyrogel® XTE). A seventh layer 522 is a layer of insulation that may be, for example, scrim glass or a white silica non-woven material. An eighth layer is a glass fiber knitted fabric such as a loosely woven Kevlar (e.g., ARMATEX® Firestar 35 fiberglass) or other woven composite material; and a ninth layer is a flame retardant material (e.g., CarbonX felt). The plurality of layers 510-526 of the back wall 436A of the first enclosure 414 may be stitched or sewn together using a fireproof thread.

The back wall 436A of the first enclosure 414 is constructed to be impermeable to gases and to insulate the heat created in an explosive event, thereby limiting instances of "hot spots" on the back wall 436A. Specifically, the back wall 436A includes the first and second layers of Aerogel-based material 516, 520 and the metallic layer 518 disposed between the first and second layers of Aerogel-based material 516, 520. The metallic layer 518 distributes and dissipates heat, thereby avoiding concentrations of high heat or forming of "hot spots" on the wall 436A of the enclosure 414. As a side effect, the metallic layer 518 limits and/or avoids electrolytes from an exploding battery, for example, from soaking into the second and lower (relative to the orientation of FIGS. 13 and 14) layer 520 of Aerogel-based material. In doing so, the effect of the Aerogel-based material is preserved after the explosion, which is important for the cool down phase of an explosive event.

In the illustrated example, the first layer of Aerogel-based material 516 has a thickness of approximately 5 mm and the second layer of Aerogel-based material 520 has a thickness of approximately 5 mm, thereby providing an approximate, total thickness of 10 mm of Aerogel. However, in other examples, each of the layers of Aerogel-based material 516, 520 may have a thickness in a range of approximately 1 mm or more (e.g., about 1 mm or more, about 3 mm or more, about 4 mm or more, about 5 mm or more) to 10 mm or less (e.g., about 9 mm or less, about 8 mm or less, about 7 mm or less, about 6 mm or less, about 5 mm or less).

In the illustrated example, the metallic layer 518 is a layer of Aluminum (e.g., Aluminum foil) having a thickness of approximately 250 μm. In some examples, they layer 518 of Aluminum foil may have a thickness in a range of approximately 50 μm or more (e.g., about 60 μm or more, about 70 μm or more, about 80 μm or more, about 90 m or more, about 100 μm or more, about 110 μm or more, about 120 μm or more, about 130 μm or more, about 140 μm or more, about 150 μm or more, about 160 μm or more, about 170 μm or more, or about 175 μm or more) to approximately 350 μm or less (e.g., about 340 μm or less, about 330 μm or less, about 320 μm or less, about 310 μm or less, about 300 μm or less, about 290 μm or less, about 280 μm or less, about 270 μm or less, about 260 μm or less, about 250 μm or less, about 240 μm or less, about 230 μm or less, about 220 μm or less, about 210 μm or less, about 200 μm or less, about 190 μm or less, or about 180 μm or less). In other examples, the metallic layer may be a different material, such as copper, gold, silver, or other suitable, light-weight heat-conductive metal.

Figure 20:
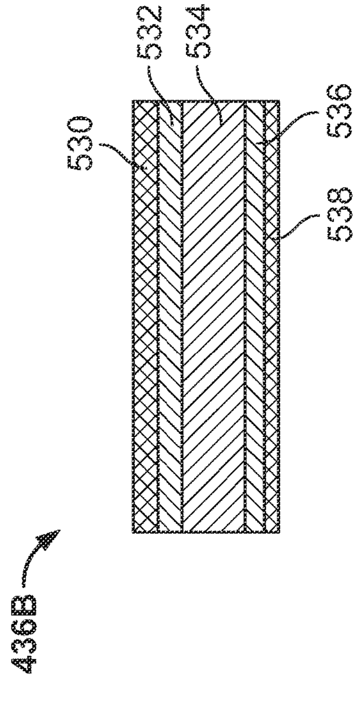
FIG. 20 is a magnified, cross-sectional view of the first enclosure, taken at section F of FIG. 18.

In FIG. 20, a bottom wall 436B of the first enclosure 414 include at least five layers and is designed to be an impermeable layer. A first (and interior) layer 530 is a flame-retardant material (e.g., CarbonX felt) adjacent to the cavity 444 of the first enclosure 414. The first layer 530 is constructed to withstand a local temperature of a PED-fire of up to 1200° C. A second layer 532 is a woven composite material and may be, for example, a glass fiber knitted fabric such as a tightly woven Kevlar (e.g., ARMATEX® Firestar 35 fiberglass) or other woven composite material that is constructed to withstand forces of an explosion, catch debris, and weather high temperatures. A third layer 534 is a layer of insulation that may be, for example, scrim glass or a white silica non-woven material. A fourth layer 536 is a woven composite material and may be, for example, a glass fiber knitted fabric such as a tightly woven Kevlar (e.g., ARMATEX® Firestar 35 fiberglass) or other impermeable woven composite material. A fifth (and exterior) layer 538 of the bottom wall 436B is a flame-retardant material (e.g., CarbonX felt). The right and left side walls of the first enclosure 414 may be composed of silica insulation or may have the same structural composition as the bottom wall 436B.

Figure 21:
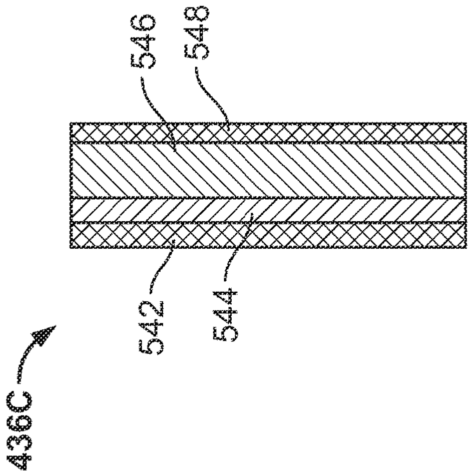
FIG. 21 is a magnified, cross-sectional view of the first enclosure, taken at section G of FIG. 18.

In FIG. 21, a front wall 436C, which is opposite the back wall 436A of the first enclosure 414, includes at least four layers of material and is intended to be the permeable layer of this bag arrangement allowing the hot gases to escape from the inner bag 414 while equalizing the temperature of the hot gases and insulating the inside of the inner bag against the outside. A first (and interior) layer 542 is a flame-retardant material (e.g., CarbonX felt) that is adjacent to the cavity 444 of the first enclosure 414. The first layer 542 is constructed to withstand a local temperature of a PED-fire of up to 1200° C. A second layer 544 is a layer of fiberglass mesh such as a fluid-permeable coarse mesh of non-burnable glass fiber (e.g., DuraFlow®). A third layer 546 is a layer of insulation that may be, for example, scrim glass or a white silica non-woven material. A fourth (and exterior) layer 548 is a flame-retardant material (e.g., CarbonX felt). In the illustrated example, the front wall 436C is the only wall of the body 436 of the first enclosure 414 that is permeable. As such, gas, but no flames, can pass through the body 436 in an upwards direction (relative to the orientation of FIGS. 13 and 14), thereby avoiding any pressure building up in the first enclosure 414 and avoiding concentrations of high temperature on the underside of the first enclosure 414. However, in other examples, one or more walls of the body 432 may be permeable, as well. Turning briefly back to FIG. 18, a lip area at the front wall 436C has a layer 551 of stiffener to avoid inner pouch pucker. The stiffener may be a sail batten, aluminum bar, or Aerogel-based material. The stiffener layer may be disposed partially or completely around the perimeter of the opening of the body 436.

Figure 22:
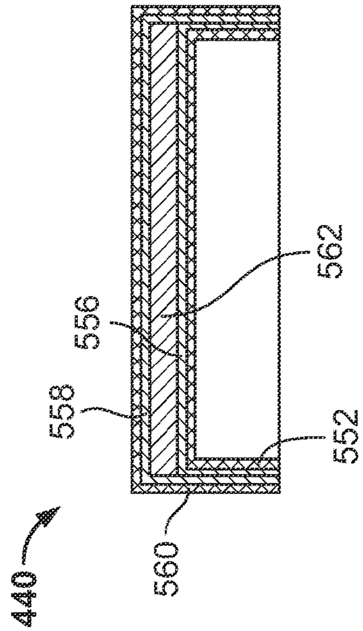
FIG. 22 is a magnified, cross-sectional view of the first enclosure, taken at section H of FIG. 18.

FIG. 22 illustrates a cross-section of the hood 440 of the first enclosure 414, and includes at least five separate layers of material. A first (and interior) layer 552 is a flame retardant material (e.g., CarbonX felt), and is adjacent to the cavity 444 of the first enclosure 414. The first layer 552 is constructed to withstand a local temperature of a PED-fire of up to 1200° C. Each of second and third layers 556, 558 is a woven composite material and may be, for example, a glass fiber knitted fabric such as a woven Kevlar (e.g., ARMATEX® Firestar 35 fiberglass) or other woven composite material. A fourth layer 560 is a flame-retardant material (e.g., CarbonX felt). A fifth layer 562, disposed between the second and third layers 556, 558, is a layer of Aerogel-based material, for example, an Aerogel coated fiberglass blanket (e.g., Pyrogel® XTE). In some examples, the fifth layer 562 provides padding as an additional sealing against the flames, and is an optional layer of insulation that may be, for example, scrim glass or a white silica non-woven material. In another example, the fifth layer 562 is instead a stiffening material.

Figure 24:
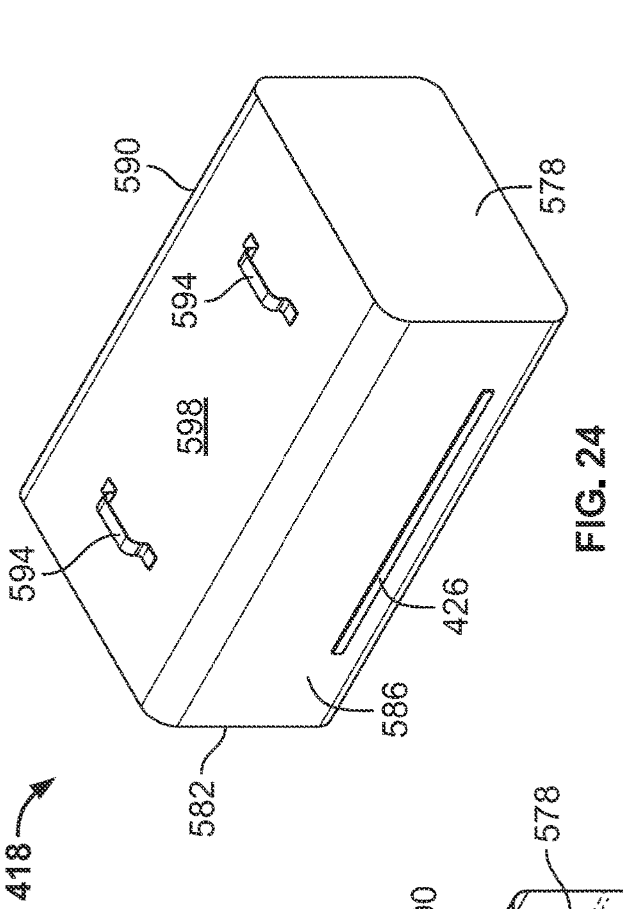
FIG. 24 is a front, perspective view of the second enclosure of FIG. 13 in a closed and expanded configuration.
Figure 25:
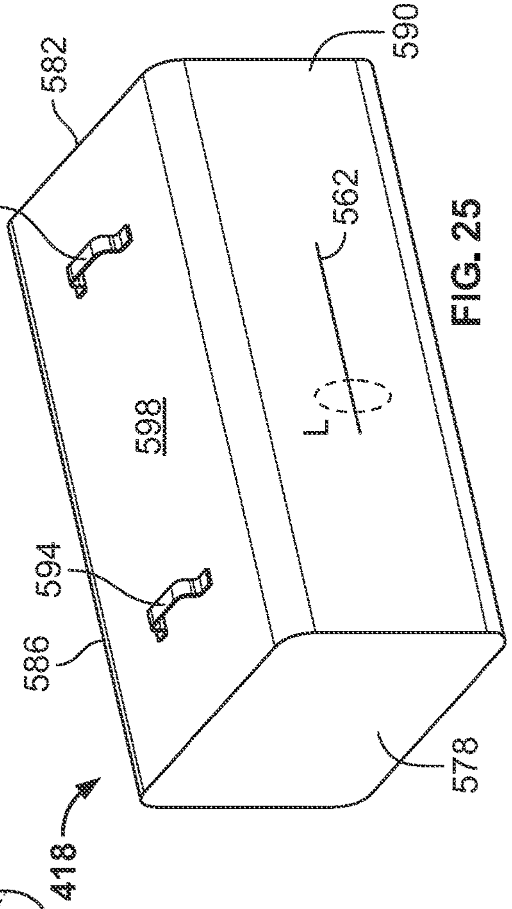
FIG. 25 is a back, perspective view of the second enclosure of FIG. 13 in the expanded configuration.
Figure 23:
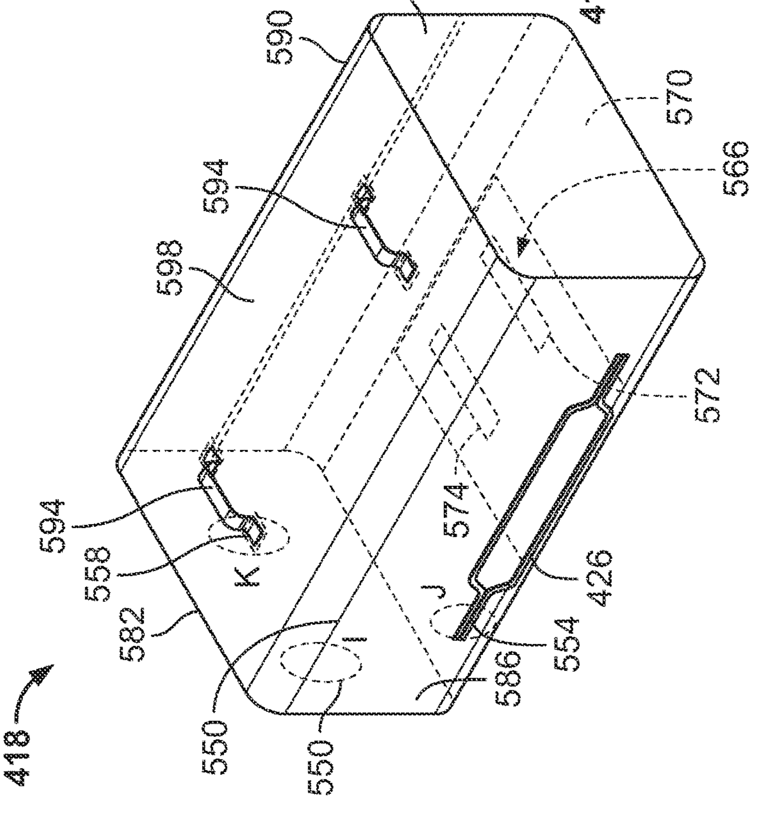
FIG. 23 is a front, perspective, transparent view of the second enclosure of FIG. 13, showing the second enclosure in an open and expanded configuration.

Turning now to FIGS. 23-25, the second enclosure 418 of the containment assembly 410 of FIGS. 13 and 14 is illustrated. The second enclosure 418 is constructed to expand when filled with gas from an explosive event. At least four different seam welds 550, 554, 558, 562, as shown in FIGS. 26-29, are formed at various parts of the second enclosure 418 to allow for expansion and/or for a controlled release of gas in an overpressure situation. The second enclosure 418 also includes an interior coupling mechanism 566 that is arranged for coupling with the back wall 436A of the first enclosure 414. The coupling mechanism 566 may fix the first enclosure 414 to an interior wall 570 of the second enclosure 418 using a hook-and-loop fastening strips 572, 574. The internal coupling mechanism 566 permits pre-assembly of the containment assembly 410.

Figure 26:
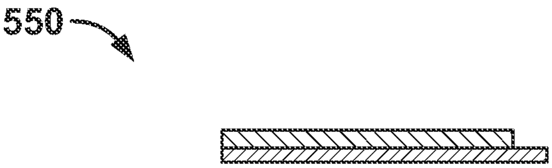
FIG. 26 is a cross-sectional view of a first weld of the second enclosure of FIG. 13, taken at a section I of FIG. 23.
Figure 27:
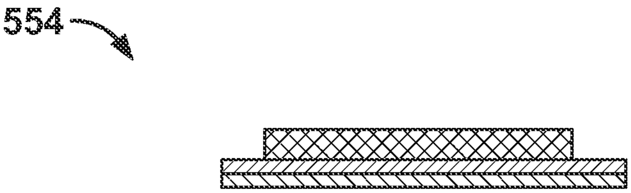
FIG. 27 is a cross-sectional view of a second weld of the second enclosure of FIG. 13 taken at a section J of FIG. 23.
Figure 28:
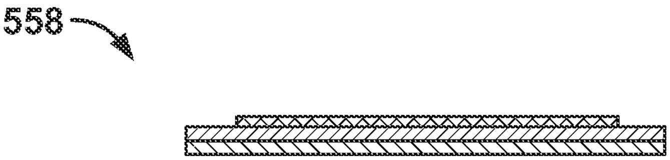
FIG. 28 is a cross-sectional view of a third weld of the second enclosure of FIG. 13 taken at a section K of FIG. 23.

In FIGS. 23 and 26, a first seam 550 is constructed using a first example weld. The first seam 550 includes two overlapping layers and is formed at a perimeter of first and second ends 578, 582 and front and back sides 586, 590 of the second enclosure 418.

In FIGS. 23 and 26, a second seam 554 is disposed around the closure device 426. The closure device 426 is a PU/PVC coated airtight nylon zipper (e.g., zipper from NySeal® Lifeproof). The zipper 426 is coupled to the front side 486 of the second enclosure 418 with the second seam 554. The second seam 554 includes at least three overlapping layers.

In FIGS. 23 and 26, a third seam 558 connects the handles 594 on a top side 598 of the second enclosure 418, totaling four seams 558 on the top side 598. The third seam 558 includes at least three layers.

Figure 29:
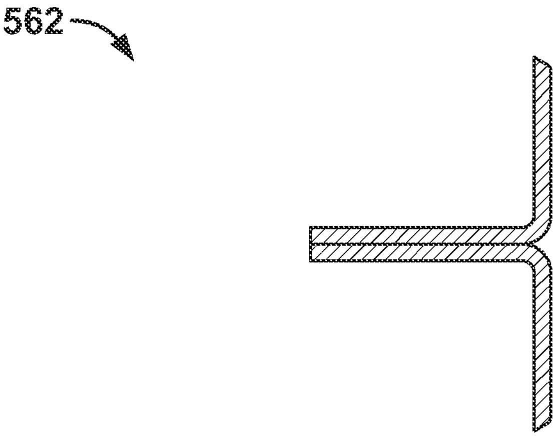
FIG. 29 is a cross-sectional view of a fourth weld of the second enclosure of FIG. 13 taken at a section L of FIG. 25.

Finally, in FIGS. 25 and 29, a fourth seam 562 is formed on the back side 590 of the second enclosure 418. The fourth seam 562 is a T-weld, and may be used instead of, or with, an overpressure valve, such as the overpressure valve 114, 118 of the first example second enclosure 18. The fourth seam 562 is configured to fail in an overpressure situation and thereby avoid uncontrolled bursting of the second enclosure 418.

Figure 30:
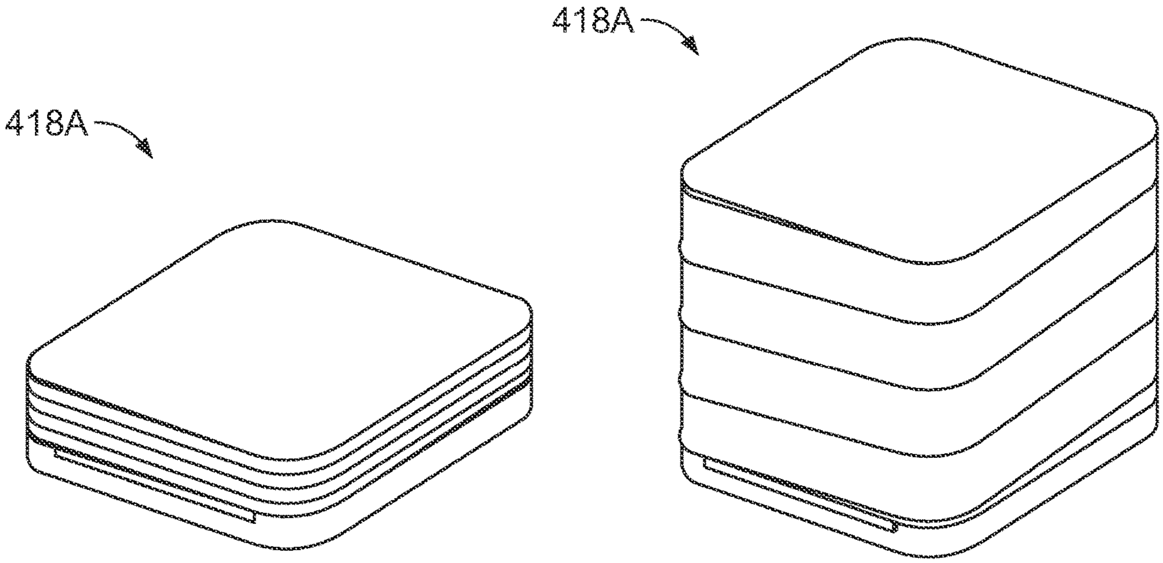
FIG. 30 is a perspective view of a variation of the second enclosure of FIG. 13, showing the second enclosure in a collapsed configuration and an expanded configuration.

Turning briefly to FIG. 30, a variation of the second enclosure 418A of FIGS. 13 and 14 is illustrated. In this variation, the second enclosure 418A has a spiral interior structure that is configured to permit expansion in a controlled manner. It will be appreciated that all other features and functions of the second enclosure 418A of FIG. 30 are the same, or substantially similar to, the features and functions of the second enclosure 418 as described above. Accordingly, the containment assembly 410 of FIG. 13 may include the variation of the second enclosure 418A paired with the first enclosure 414 to safely contain an explosive event.

Figure 31:
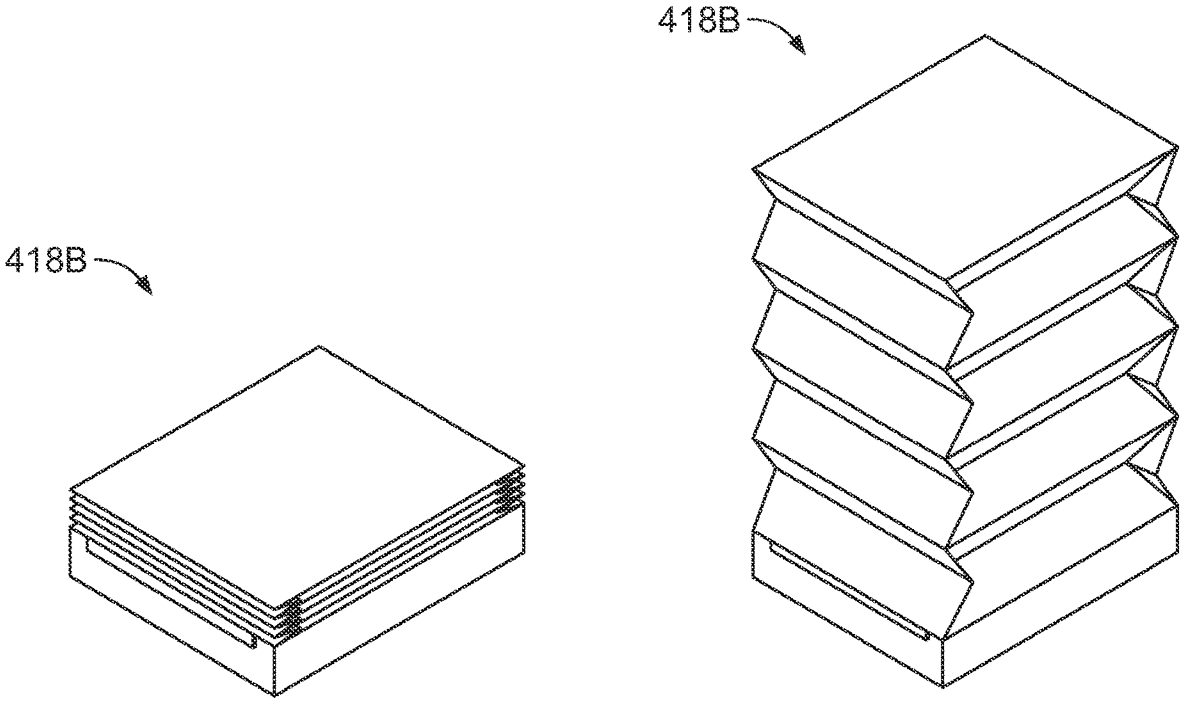
FIG. 31 is a perspective view of another variation of the second enclosure of FIG. 13, showing the second enclosure in a collapsed configuration and an expanded configuration.

In FIG. 31, another variation of the second enclosure 418B of FIGS. 13 and 14 is illustrated. In this variation, the second enclosure 418B defines an accordion-like body. It will be appreciated that all other features and functions of the second enclosure 418B of FIG. 31 are the same, or substantially similar to, the features and functions of the second enclosure 418 as described above. Accordingly, the containment assembly 410 of FIG. 13 may include the variation of the second enclosure 418B paired with the first enclosure 414 to safely contain an explosive event. Both FIGS. 30 and 31 illustrate a dense storage solution to minimize the storage volume, which may be assisted by vacuum packing. Other implementations are possible.

Figure 32:
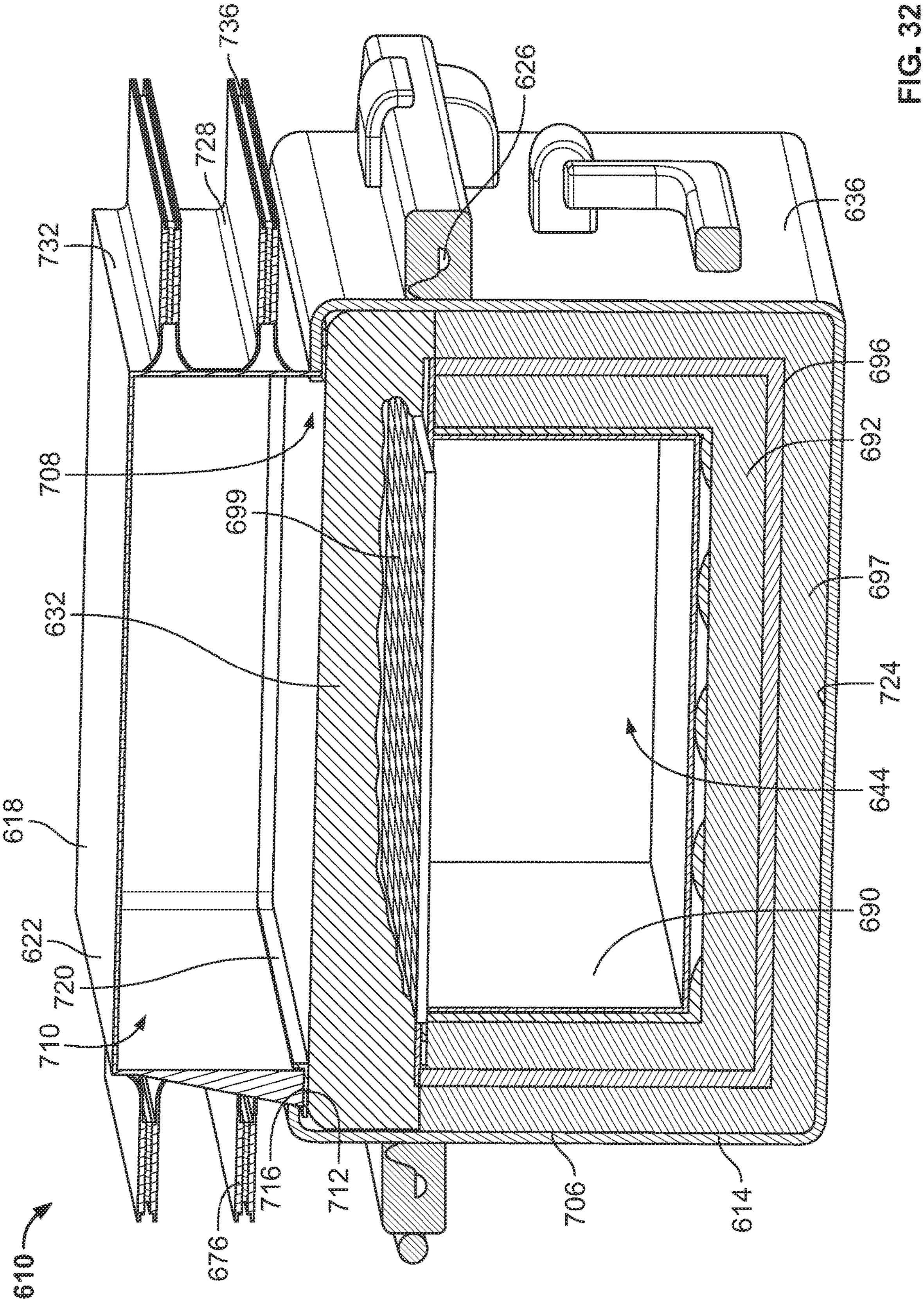
FIG. 32 is a partial, perspective view of another containment assembly in accordance with the teachings of the present disclosure.

FIG. 32 illustrates a fourth example containment assembly 610 for containing an explosive event of a hazardous object. The fourth example containment assembly 610 is similar to the containment assembly 210 of FIGS. 9-12, but includes a different enclosure arrangement for containing an explosive event. Like the second containment assembly 210, the fourth example containment assembly 610 includes a first enclosure 614, a second enclosure 618, and a gas permeable barrier 632 disposed between the first and second enclosures 614, 618. Also, the fourth example containment assembly 610 expands in a similar way as the containment assembly 210, as shown in FIGS. 11 and 12. Thus, for ease of reference, and to the extent possible, the same or similar components of the fourth example containment assembly 610 will retain the same reference numbers as outlined above with respect to the second example containment assembly 210, although the reference numbers will be increased by 400. However, the fourth example containment assembly 610 differs from the second example containment assembly 210 in the manner discussed below.

The first enclosure 614 has a first layer 690, a second layer 692, a third layer 696, a fourth layer 697, and a fifth or outer layer 706. The first, second, and third layers 690, 692, 696, 697 are attached to an interior wall 724 of a body 636. The first layer 690 is a fireproof material layer, and the second and fourth layers 692, 697 are layers of Aerogel-based material. The third layer 696 is a metallic layer (e.g., Aluminum) disposed between the first and second layers of Aerogel-based material 692, 696. A permeable layer arrangement, which may contain a grid 699, is disposed above the fireproof and insulation layers that can receive and withstand debris and fire, but will permit fumes to pass into the second enclosure 618.

Each of the example containment assemblies 10, 210, 410, 610 may be designed and constructed to contain a certain UL class explosion, or in other words, to accommodate larger volumes of gas generated in larger explosions. For example, the second enclosures 218, 618 of the containment assemblies 210, 610 may be constructed to receive gas byproduct based on the UL class of the hazardous object or explosion.

The example containment assemblies 10, 210, 410, 610 may be easily accessible for emergency situations. In one example situation of using the first and third example containment assemblies 10, 410 is on board an active flight (however, other use cases are possible for example, in buildings, submarines, yachts, etc.). In this example, a user of the containment assembly 10 may be a flight attendant or other person aboard trained in handling and containing hazardous objects on an active flight. After identifying a hazardous object (e.g., a PED experiencing thermal runaway), the attendant may remove the first enclosure 14 from the second enclosure 18, unfasten the fastening assembly 48 to remove the flap 40 from the body 36, and place the hazardous PED inside the cavity 44 of the first enclosure 14. To seal the first enclosure 14 around the hazardous object, the attendant may align the mating hook and loop of the second mating structure 56 before coupling the buckles of the first mating structure 52. Once buckled, the attendant can be confident that the first enclosure 14 is sealed for containing an explosive event. The attendant may then unfold and unzip the second enclosure 18 and place the first enclosure 14 inside the inner volume 110 of the second enclosure 18 and then seal the second enclosure 18 by closing the welded zipper 26. In other examples, the first enclosure 14 may be connected to the second enclosure 18 by straps or other coupling mechanism so that the first enclosure 14 is pre-inserted in the second enclosure 18. This feature ensures that the lower end of the first enclosure 14 is properly arranged inside the appropriate second enclosure 18.

When using the third containment assembly 410, the open first enclosure 414 may be readily accessed in its pre-assembled position within the second enclosure 418. To seal the first enclosure 414 around the hazardous object, the attendant may close the opening by rotating the hood 440 to occupy the partially closed position, and lift the flap 454 to secure the coupling mechanism between the flap 454 and the hood 440. The attendant may then push the first enclosure 414 further into the second enclosure 418 and then seal the second enclosure 418 by securing the welded zipper 426.

After the explosive event, the second enclosures 18, 418 will gradually fill up with gas without leaking any gas to the environment. In case of a larger than expected explosion (for example, a UL class 4 explosion in an assembly 10 designed to receive a class 3 explosion), the overpressure valves 114, 118 of the first containment assembly 10 and/or the imperfect seal 562 will vent. In certain locations in the aircraft, the air may be ventilated out of the aircraft so that the noxious gases do not reach the passengers on flight. This may be done in the galley, for example, or the second enclosure 18, 418 is simply filled and kept as it is until the aircraft lands. A similar method of operation is applicable to using the second and fourth example containment assemblies 210, 610.

The example containment assemblies 10, 210, 410, 610 described herein safely contain class 3 and class 4 explosive events without harming people nearby. The assemblies 10, 210, 410, 610 are especially useful for containing explosive events on active flights, thereby avoiding emergency landings due to the presence of a PED experiencing thermal runaway. Each of the containment assemblies 10, 210, 410, 610 prevents widespread panic and toxic gas exposure of the passengers on board, by compensating for large gas volumes generated by UL class 3 and class 4 explosions. Smaller class 1 and 2 bags are possible as well. The materials of the containment assemblies 10, 210, 410, 610 may be chosen based on certain material properties, such as, strength, flexibility, fire-resistance, and weight so that regardless of the expanded volume of the gas byproduct, each containment assembly 10, 210, 410, 610 is foldable for storage.

The example containment assemblies 10, 210, 410, 610 include a smart insulation arrangement implemented on the lower side of the assembly to allow the event to happen and especially also to cool down over a longer period of time without exceeding maximum allowable temperatures on the lower side.

Further, the containment assemblies 10, 210, 410, 610 may be scaled-up or down based on the anticipated UL class explosion of various PEDs typically found on-board a flight or submarine (however, other use cases are possible for example, in buildings, yachts, etc.). Based on the resulting temperature and pressure of various explosions, an expected volume of gas byproduct may be accurately predicted. Thus, the size of the second enclosure 18, 218 for each containment assembly 10, 210, 410, 610 may be designed and constructed based on the predicted gas volumes.

While this specification contains many specific implementation details, these should not be construed as limitations on the scope of any disclosure or of what may be claimed, but rather as descriptions of features that may be specific to particular examples of particular disclosures. Certain features that are described in this specification in the context of separate examples can also be implemented in combination in a single example. Conversely, various features that are described in the context of a single example can also be implemented in multiple examples separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described herein should not be understood as requiring such separation in all examples, and it should be understood that the described program components and systems can generally be integrated together in a single product or packaged into multiple products.

Particular examples of the subject matter have been described. Other examples are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A containment assembly comprising:

a first enclosure comprising a cavity for receiving a hazardous object, the first enclosure configured for containing an explosive event of the hazardous object;

a second enclosure comprising a gas impermeable layer, an inner volume, and an air-tight closure, the second enclosure configured for receiving and containing a gas byproduct of the explosive event from the first enclosure, wherein pressure relief valves are integrated with the second enclosure to avoid the gas impermeable layer from ripping; and a gas permeable barrier disposed between the cavity of the first enclosure and the inner volume of the second enclosure.

2. The containment assembly of claim 1, wherein the first enclosure defines the gas permeable barrier.

3. The containment assembly of claim 1, wherein the first enclosure comprises an interior layer of a flame retardant material and an embedded layer of a woven composite material.

4. The containment assembly of claim 1, wherein the first enclosure comprises a fastening assembly, and is movable between an open position, in which the cavity is accessible and the fastening assembly is disconnected, and a closed position, in which the fastening assembly is engaged.

5. The containment assembly of claim 4, wherein the fastening assembly comprises a first mating structure and a second mating structure, wherein the first mating structure is configured to lock the first enclosure when the second mating structure is in alignment.

6. The containment assembly of claim 1, wherein the first enclosure has a flexible body.

7. The containment assembly of claim 1, wherein the inner volume of the second enclosure is expandable for containing a volume of gas in a range of approximately 50 liters to approximately 350 liters.

8. The containment assembly of claim 1, wherein the first enclosure is sealably coupled to the second enclosure.

9. The containment assembly of claim 1, wherein the gas permeable barrier at least partially defines the inner volume of the second enclosure.

10. The containment assembly of claim 1, wherein the second enclosure is movable between a collapsed configuration and an expanded configuration.

11. A method of containing a hazardous object, the method comprising:

receiving a hazardous object in a cavity of a first enclosure of a containment assembly;

containing an explosive event of the hazardous object in the first enclosure;

receiving, in an inner volume of a second enclosure, a gas byproduct of the hazardous object from the explosive event through a gas permeable barrier, the gas permeable barrier disposed between the cavity of the first enclosure and the inner volume of the second enclosure;

containing the gas byproduct in the inner volume of the second enclosure, the second enclosure comprising a gas impermeable body; and integrating pressure relief valves with the second enclosure to avoid the gas impermeable body from ripping.

12. The method of claim 11, comprising sealing the first enclosure around the hazardous object.

13. The method of claim 11, comprising sealing the second enclosure, through a gas-tight closure, before receiving the gas byproduct.

14. The method of claim 11, wherein containing the gas byproduct comprises expanding a flexible body of the second enclosure as pressure increases inside the inner volume of the second enclosure.

15. The method of claim 11, wherein receiving the hazardous object comprises placing the hazardous object against a flame retardant layer of the first enclosure, the first enclosure comprising a flexible layer adjacent the flame retardant layer.

16. The method of claim 11, comprising choosing the second enclosure based on a fire class of the hazardous object.

17. The method of claim 11, comprising unfolding the explosive containment assembly from a collapsed configuration.

* * * * *